US012735133B2

(12) United States Patent
Holaday et al.

(10) Patent No.: US 12,735,133 B2
(45) **Date of Patent: *Sep. 15, 2026**

(54) TRAVEL ADJUST FEATURES FOR A DROPPER SEATPOST ASSEMBLY

(71) Applicant: Fox Factory, Inc., Duluth, GA (US)

(72) Inventors: Thomas Samuel Holaday, Arden, NC (US); Joshua Coaplen, Asheville, NC (US)

(73) Assignee: Fox Factory, Inc., Duluth, GA (US)

( * ) Notice: Subject to any disclaimer, the term of this patent is extended or adjusted under 35 U.S.C. 154(b) by 97 days.

This patent is subject to a terminal disclaimer.

(21) Appl. No.: 18/786,339

(22) Filed: Jul. 26, 2024

(65) Prior Publication Data

US 2025/0050957 A1 Feb. 13, 2025

Related U.S. Application Data

(63) Continuation-in-part of application No. 18/099,938, filed on Jan. 21, 2023, now Pat. No. 12,269,548.

(60) Provisional application No. 63/369,891, filed on Jul. 29, 2022, provisional application No. 63/301,900, filed on Jan. 21, 2022.

(51) Int. Cl.
*B62J 1/06* (2006.01)
*B62J 1/08* (2006.01)

(52) U.S. Cl.
CPC ............ *B62J 1/08* (2013.01); *B62J 2001/085* (2013.01)

(58) Field of Classification Search
CPC .............................. B62J 1/08; B62J 2001/085
See application file for complete search history.

(56) References Cited

U.S. PATENT DOCUMENTS

| | | | |
|---|---|---|---|
| 6,631,947 | B2 | 10/2003 | Faltings |
| 7,025,522 | B2 | 4/2006 | Sicz et al. |
| 8,302,983 | B1 | 11/2012 | Hsu |
| 8,752,893 | B2 | 6/2014 | Chien et al. |
| 8,781,690 | B2 | 7/2014 | Hara et al. |
| 8,814,109 | B2 | 8/2014 | Calendrille et al. |
| 8,833,848 | B2 | 9/2014 | Shirai |
| 8,894,025 | B2 | 11/2014 | Wehage et al. |
| 9,376,159 | B2 | 6/2016 | Kuo |
| 9,422,018 | B2 | 8/2016 | Pelot et al. |

(Continued)

FOREIGN PATENT DOCUMENTS

| | | | |
|---|---|---|---|
| CA | 3053537 | A1 | 2/2020 |
| CN | 209617331 | U | 11/2019 |

(Continued)

OTHER PUBLICATIONS

European Search Report for European Application No. 23152966.0, 7 pages, Jun. 20, 2023.

*Primary Examiner* — Rodney B White

(57) ABSTRACT

A dropper seatpost assembly is disclosed. The dropper seatpost assembly includes a lower post comprising a travel adjustment bore, an upper post configured to interactively operate with respect to the lower post, and a translating assembly configured to maintain an orientation of the upper post with respect to the lower post. The dropper seatpost assembly includes a first top out path with a first travel length and a second top out path, wherein the second top out path is distinct from the first top out path and wherein the second top out path provides a modified travel length different than the first travel length.

19 Claims, 25 Drawing Sheets

(56) References Cited

U.S. PATENT DOCUMENTS

| | | | | |
|---|---|---|---|---|
| 9,878,754 | B2 | 1/2018 | Tsai | |
| 10,081,405 | B2 | 9/2018 | Mcandrews et al. | |
| 10,093,374 | B2 | 10/2018 | Mcpherson et al. | |
| 10,189,522 | B2 * | 1/2019 | Pittens | B62J 1/08 |
| 10,399,624 | B2 | 9/2019 | Teixeira | |
| 10,422,355 | B2 | 9/2019 | Pittens et al. | |
| 10,450,022 | B2 | 10/2019 | Watson | |
| 10,479,431 | B2 | 11/2019 | Winefordner et al. | |
| 10,513,300 | B2 | 12/2019 | Bowers | |
| 10,562,578 | B2 | 2/2020 | Teixeira et al. | |
| 10,625,800 | B2 | 4/2020 | Mcandrews et al. | |
| 10,647,373 | B2 | 5/2020 | Mcandrews et al. | |
| 10,710,662 | B2 | 7/2020 | Bowers et al. | |
| 10,780,932 | B2 | 9/2020 | Shirai | |
| 10,974,781 | B2 | 4/2021 | Staples | |
| 11,077,901 | B2 * | 8/2021 | Pittens | B62J 1/06 |
| 11,091,215 | B2 | 8/2021 | Madau et al. | |
| 11,180,212 | B2 | 11/2021 | Shirai | |
| 11,661,129 | B2 * | 5/2023 | Chambers | B62J 1/08 297/199 |
| 11,661,130 | B2 * | 5/2023 | Quenzer | B62J 1/08 297/215.13 |
| 11,780,521 | B2 * | 10/2023 | Dubois | B62J 1/08 297/195.1 |
| 12,151,757 | B2 | 11/2024 | Ahnert et al. | |
| 12,179,870 | B2 * | 12/2024 | Dunlap | B62J 1/06 |
| 12,269,548 | B2 * | 4/2025 | Holaday | B62J 1/06 |
| 12,286,180 | B2 * | 4/2025 | Chambers | B62J 1/08 |
| 12,291,297 | B2 * | 5/2025 | Chambers | B62J 43/20 |
| 12,429,074 | B2 * | 9/2025 | Coaplen | F15B 15/1452 |
| 2019/0002048 | A1 | 1/2019 | Winefordner et al. | |
| 2019/0308681 | A1 | 10/2019 | Staples | |
| 2019/0367114 | A1 | 12/2019 | Winefordner et al. | |
| 2020/0070913 | A1 | 3/2020 | Staples | |
| 2021/0094642 | A1 | 4/2021 | Dubois et al. | |
| 2021/0371028 | A1 | 12/2021 | Coaplen et al. | |
| 2024/0417013 | A1 * | 12/2024 | Dunlap | F16F 9/0272 |
| 2025/0042490 | A1 * | 2/2025 | Dunlap | B62J 1/08 |
| 2025/0065972 | A1 * | 2/2025 | Payton | B62J 50/00 |
| 2025/0083762 | A1 * | 3/2025 | Dunlap | B62J 1/08 |
| 2025/0100638 | A1 * | 3/2025 | Shipman | B62J 45/00 |
| 2025/0100639 | A1 * | 3/2025 | Shipman | B62J 1/08 |
| 2025/0100640 | A1 * | 3/2025 | Shipman | B62K 19/36 |
| 2025/0115323 | A1 * | 4/2025 | Chambers | B62J 1/08 |
| 2025/0162671 | A1 * | 5/2025 | Holaday | B62J 1/08 |
| 2025/0187687 | A1 * | 6/2025 | Dunlap | B62J 1/08 |
| 2025/0376994 | A1 * | 12/2025 | Coaplen | F15B 15/1452 |
| 2026/0001604 | A1 * | 1/2026 | Dunlap | B62J 1/06 |
| 2026/0028078 | A1 * | 1/2026 | Otterness | B62J 1/08 |
| 2026/0029058 | A1 * | 1/2026 | Pfeiffer | F16K 11/0716 |

FOREIGN PATENT DOCUMENTS

| | | | |
|---|---|---|---|
| CN | 210634677 | U | 5/2020 |
| CN | 212401431 | U | 1/2021 |
| CN | 112606930 | A | 4/2021 |
| CN | 213008477 | U | 4/2021 |
| CN | 213138994 | U | 5/2021 |
| CN | 213168365 | U | 5/2021 |
| CN | 213705633 | U | 7/2021 |
| CN | 214648699 | U | 11/2021 |
| EP | 4215429 | A1 | 7/2023 |
| TW | I615306 | B | 2/2018 |
| TW | M576558 | U | 4/2019 |
| TW | M599270 | U | 8/2020 |
| TW | M605174 | U | 12/2020 |
| TW | M605175 | U | 12/2020 |
| TW | M605177 | U | 12/2020 |
| TW | M613821 | U | 7/2021 |
| TW | M613950 | U | 7/2021 |

* cited by examiner 315
526
525
550
505
50
325
510
310
350

310
325
510
510
510
505
525
315

310
325
505
525
315

315
505/710

315
50
550
926
925
325
310

325
310
926
925
525
525
525
525
1205
1205
550
50
925
315

50
310
1305
1300
1575
1505
315

50
310
1305
1300
1575
1505
315

50
1305
1605
1605

50
310
1305
1300
315
1605
1605

TRAVEL ADJUST FEATURES FOR A DROPPER SEATPOST ASSEMBLY

CROSS-REFERENCE TO RELATED APPLICATIONS

This application is a continuation-in-part and claims priority to and benefit of U.S. patent application Ser. No. 18/099,938 filed Jan. 21, 2023, now U.S. Pat. No. 12,269,548 B2, entitled "TRAVEL ADJUST SYSTEM FOR DROPPER SEATPOSTS" by Holaday et al., and assigned to the assignee of the present application, the disclosure of which is hereby incorporated by reference in its entirety.

U.S. patent application Ser. No. 18/099,938 claims priority to and benefit of U.S. Provisional Patent Application No. 63/301,900 filed on Jan. 21, 2022, entitled "TRAVEL ADJUST SYSTEM FOR DROPPER SEATPOSTS" by Holaday et al., and assigned to the assignee of the present application, the disclosure of which is hereby incorporated by reference in its entirety.

U.S. patent application Ser. No. 18/099,938 claims priority to and benefit of U.S. Provisional Patent Application No. 63/369,891 filed on Jul. 29, 2022, entitled "TRAVEL ADJUST SYSTEM FOR DROPPER SEATPOSTS" by Holaday et al., and assigned to the assignee of the present application, the disclosure of which is hereby incorporated by reference in its entirety.

FIELD OF THE INVENTION

Embodiments of the invention generally relate to systems and methods for utilizing a dropper seatpost assembly.

BACKGROUND

Seat (or saddle) height and orientation are important parts of a vehicle setup (such as a bike, unicycle, tricycle, electric bike (e-bike), and the like). If the saddle is too high, a rider would feel unstable and have difficulty reaching the ground or even the bottom stroke of the pedals. In contrast, if the saddle is too low, the rider sitting in the saddle would feel cramped and would not obtain proper leg extension while pedaling in the seated position. Moreover, what would be considered a good saddle height for riding along a relatively flat surface may not be a good saddle height for climbing a hill, descending a hill, riding across rough terrain, etc. As such, there is no universally applicable saddle geometry settings, instead saddle settings are always subject to rider and use case preferences and geometries.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of vehicles that have a seat, a bicycle (bike) will be used to provide guidance for the terms and directional language. However, it should be appreciated that the embodiments are also well suited for other vehicles such as, but not limited to, road bike, mountain bike, gravel bike, unicycle, tricycle, electric bike (e-bike), and the like.

The term "seatpost" refers to a stand-alone component, e.g., a tube or another geometric shaped member that has at least a portion of a head assembly at an end or an approximate end thereof. The head assembly is used to couple a bike saddle with the seatpost.

The term "seat post opening" refers to an opening in a portion of a bike frame within which the seatpost is inserted or otherwise attached.

The term "saddle height" refers to the distance between the top of the saddle (e.g., where a rider would sit) and the ground, or the pedals, or another frame of reference of the bike. For example, a taller rider would normally have a higher saddle height than that of a shorter rider.

The following discussion provides a novel solution that provides travel adjustable features for a dropper seatpost assembly. Moreover, embodiments described herein provide a dropper seatpost assembly that can be used with a number of different frames, different seatpost clamps, different seatpost clamp torques, and different dropper seatpost assembly designs.

Operation

Figure 1:
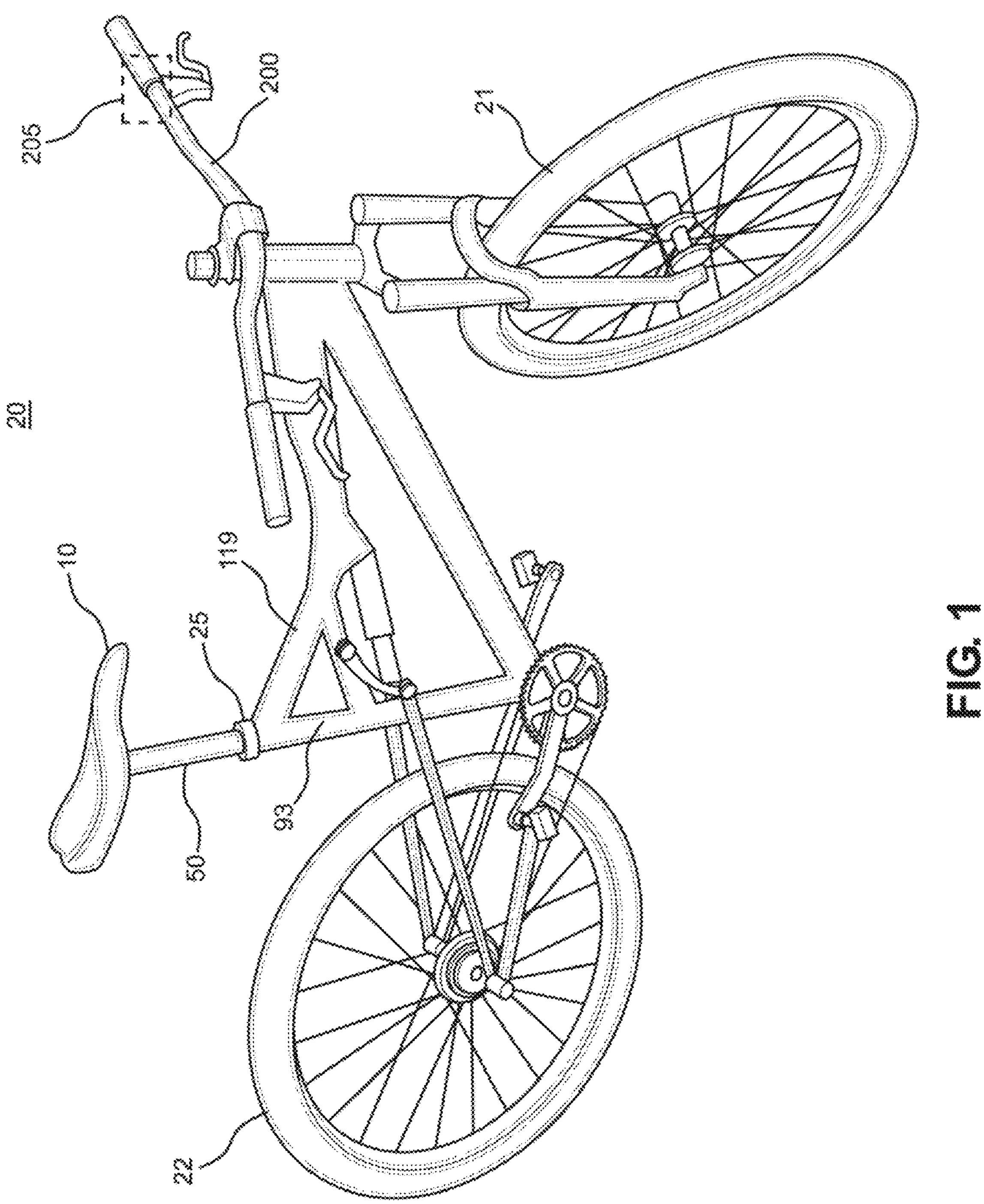
FIG. 1 is a perspective view of a bike, in accordance with an embodiment.

Referring now to FIG. 1, a bike 20 is shown in accordance with an embodiment. In general, bike 20 has a front (e.g., the general location of the handlebars 200 and the front wheel 21) and a rear (e.g., the general location of the rear wheel 22). For purposes of the discussion the front and rear of the bike 20 can be considered to be in a first plane. A second plane that is perpendicular to the first plane would be similar to an exemplary flat plane of the ground upon which bike 20 is ridden.

In general, the bike 20 includes pedals, wheels, a chain or other drive mechanism, brakes, an optional suspension, a saddle 10 (or bike seat), handlebars 200, a dropper seatpost assembly 50, a rider interface 205, a frame 119, a seat post opening 93, and a seatpost clamp 25.

When installing a standard seatpost, the seatpost is partially inserted into the seat post opening 93 and then held in position with a clamping member such as seatpost clamp 25. In so doing, a rider is able to adjust the amount of seatpost sticking out of the seat post opening 93; which is directly related to the vertical height of the saddle (e.g., the saddle height—or how far the saddle is above the ground, above the pedals, etc.).

In one embodiment, a head assembly allows the saddle 10 to be adjustably located with respect to the seatpost before and after the seatpost is installed in the seat post opening 93. For example, once the seatpost is installed in the seat post opening 93, the head assembly adjustability will allow a rider to adjust the horizontal location of the saddle 10 (e.g., toward the front or rear of the bike) and the pitch of the saddle 10 (e.g., nose-up, nose-level, nose-down).

In a standard seatpost configuration, part of the bike setup is establishing an appropriate saddle height for a given rider. For example, a rider would have a certain saddle to pedal distance, e.g., a pre-established (hereinafter "normal") saddle height. This normal saddle height is rider specific and can include a number of trials before the rider settles on the normal saddle height. Once the normal saddle height is determined, the seatpost is clamped into a fixed position such that the normal saddle height and saddle 10 orientation is maintained until the seatpost is unclamped.

This modifiable saddle height capability is important to allow different riders to utilize similar components and merely adjust the saddle height by changing the amount of seatpost that is extending from the seat post opening 93. However, as a rider tackles different challenges throughout a given ride, there is a growing need for the capability to make rider-to-bike saddle-height geometry changes.

For example, when going up a hill and/or sprinting, a rider will often take a standing position for additional leverage, power transference, and the like. In another example, when going down a hill (or over rough terrain, if standing for additional leverage, etc.), a rider would likely prefer a shorter saddle to pedal distance (hereinafter lower saddle height) to allow the rider to lower their center of gravity, lean further backward to change the center of gravity of the bike, use their legs to absorb bumps, and the like. As such, it is helpful to be able to adjust the saddle height during a ride.

A dropper seatpost assembly (hereinafter dropper seatpost assembly 50) is a seatpost design shown in detail beginning with FIG. 4A and described in further detail herein. In one embodiment, the basic dropper seatpost assembly 50 design includes a lower post that is fixedly coupleable to the bike frame and an upper post that is telescopically moveably coupled with the lower post and which includes the head assembly at a top thereof.

In one embodiment, an actuator assembly allows the upper post to be vertically moveable (or adjustable) with respect to the lower post, such that the rider can operate a rider interface 205 (such as a control lever or the like) to "drop" the dropper seatpost assembly 50 to a lowered saddle height and then use the rider interface 205 (which may mean the same (or a different) control lever) to "return" the dropper seatpost assembly 50 to the normal saddle height. In one embodiment, this two-position capability allows a rider to have a normal saddle height and also a lowered saddle height for traversing uphill's, sprints, downhills, bumpy terrain, or the like. Although in one embodiment two positions are mentioned, as discussed in detail herein, in one embodiment, the dropper seatpost assembly 50 could be adjustable to a plurality or an "infinite" number of different saddle height positions. Thus, the use of two positions is merely one embodiment which is used herein for purposes of clarity.

In one embodiment, dropper seatpost assembly 50 is inserted into seat post opening 93 (such as, for example, in one embodiment, via a slip-fit or the like) and seatpost clamp 25 is used to removably couple the dropper seatpost assembly 50 with the seat post opening 93. Once seatpost clamp 25 is tightened, the dropper seatpost assembly 50 and the saddle 10 attached thereto will be removably coupled at a given orientation with respect to frame 119.

In one embodiment, the weight of dropper seatpost assembly 50 is an important guiding principle in the development and manufacture design criteria for dropper seatpost assembly 50. It is often the case (and may also be dependent upon use case) that a lighter dropper seatpost assembly 50 is preferred over a heavier dropper seatpost assembly 50. As such, in one embodiment, areas where weight savings can be obtained in a dropper seatpost assembly 50 design include manufacturing one or more of the dropper seatpost assembly 50 components with a thinner wall thickness, using a lighter material, etc.

With respect to bike frame 119, between bike frame manufacturers, seat post opening 93 diameters can differ in size by a number of millimeters. Thus, a dropper seatpost assembly 50 having a certain diameter could fit snugly within a given frame 119 having a seat post opening 93 with a first diameter, but be somewhat loose in a frame 119 with a seat post opening 93 having a second diameter that is a bit larger than the first diameter. Thus, in one embodiment, where frame 119 has the larger diameter seat post opening 93, the seatpost clamp 25 would need to provide additional clamping force to reduce the diameter of the seat post opening 93 and properly clamp and maintain the orientation of the dropper seatpost assembly 50. However, this increased amount of clamping force on the seat post opening 93 (which is usually made with thicker material than that of the lower post of dropper seatpost assembly 50) would likely also slightly deform the lower post of the dropper seatpost assembly 50 inserted therein.

With respect to seatpost clamp 25, in one embodiment, a rider may upgrade a seatpost clamp 25, replace a seatpost clamp 25 or the like. This replacement or upgrade could be based on wear, age, environment, weight reduction purposes, functional purposes (e.g., heavy duty clamp for more challenging environments or performance requirements), etc. With different seatpost clamps, there can be different torque requirements, different clamping ranges, different pressure application, etc. Thus, for example, the original seatpost clamp 25 may have had a torque required for clamping of 10 ft-lbs., while the replacement seatpost clamp 25 has a torque required for clamping of 30 ft-lbs. In one embodiment, the replacement seatpost clamp with the higher torque requirement would therefore have a higher clamping pressure and would likely provide further deformation of the seat post opening 93 which would also likely result in a slight deformation of the lower post of the dropper seatpost assembly 50 after it has been inserted therein and the seatpost clamp 25 has been tightened to the higher clamping pressure.

With respect to dropper seatpost assembly 50 designs, between different dropper seatpost assembly 50 manufacturers, dropper seatpost assembly 50 diameters can differ in size by a number of millimeters. Thus, a dropper seatpost assembly 50 having a certain diameter could properly slip-fit within a given seat post opening 93, but a different dropper seatpost assembly 50 having a smaller diameter would be somewhat loose in the same seat post opening 93. Thus, in the smaller dropper seatpost assembly 50 diameter example, in one embodiment, the seatpost clamp 25 would need to provide additional clamping force to reduce the seat post opening 93 to properly clamp and maintain the dropper seatpost assembly 50. However, this increased amount of clamping force on seat post opening 93 (which is usually thicker material than that of the dropper seatpost assembly 50) would likely also slightly deform the lower post of dropper seatpost assembly 50 that is inserted therein.

Figure 2:
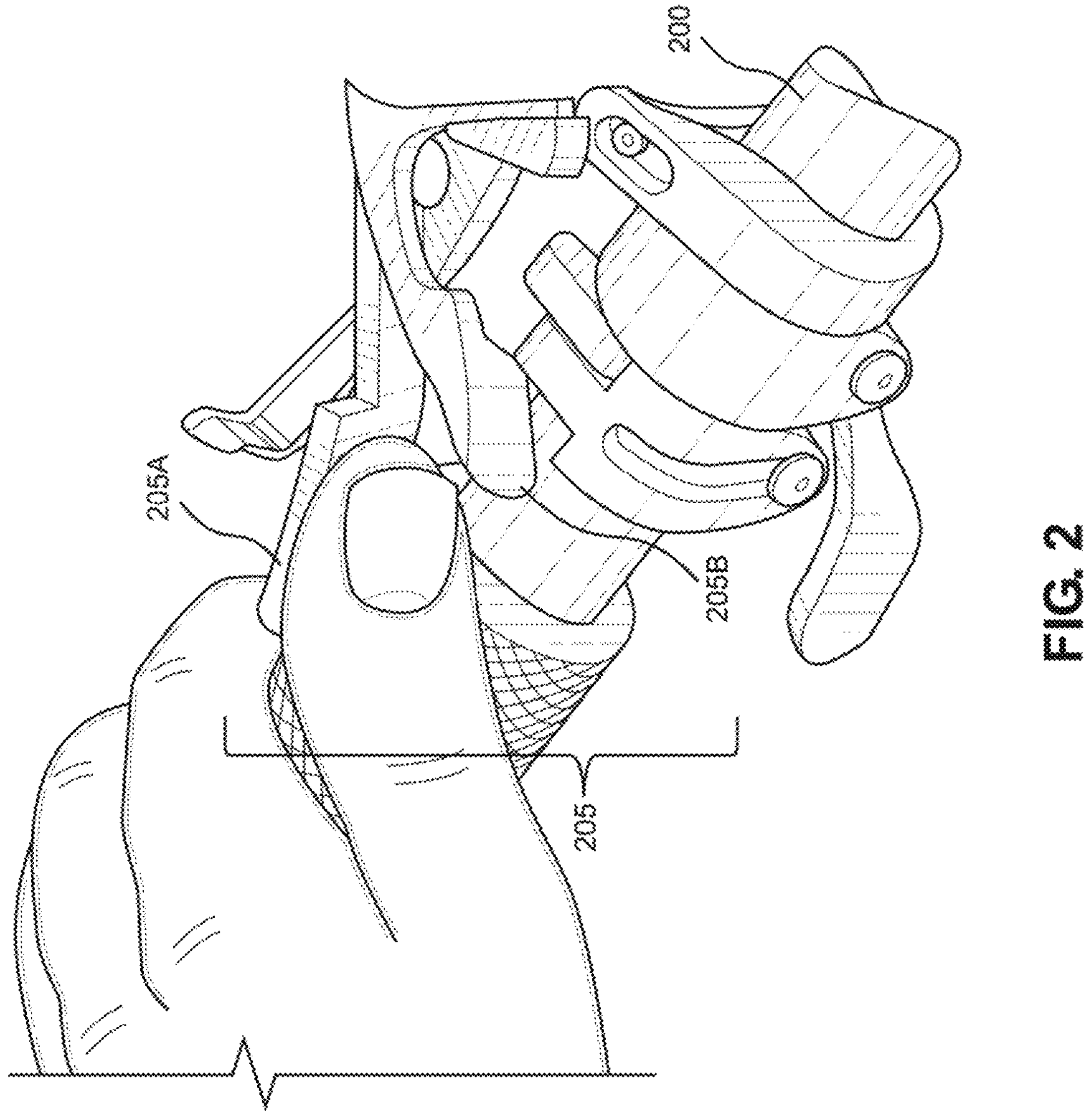
FIG. 2 is a perspective view of a handlebar with a control lever coupled therewith, in accordance with an embodiment.

FIG. 2 depicts a blown-up portion of handlebar 200 having the rider interface 205 coupled therewith according to an embodiment. The rider interface 205 is a type of rider interface with which the rider employs for communicating saddle height instructions to the dropper seatpost assembly 50. Of note, the rider interface 205 may be, but is not limited to, any of the following components capable of communicating with the dropper seatpost assembly 50: wireless device, power meter, heart rate monitor, voice activation device, GPS device having stored map, graphical user interface (GUI), button, dial, smart phone (e.g., iPhone™), lever, button, or the like. Moreover, although the rider interface 205 is shown coupled with handlebar 200. In another embodiment, the rider interface 205 could be located on another portion of the bike frame 119, on a mount coupled with a portion of the bike frame 119 or handlebar 200, or the like.

The rider interface 205 includes at least one control, such as the first rider interface 205A and may include a second rider interface 205B, it should be understood that in an embodiment, there may be only a single control, or in an embodiment there may be a set of controls. The rider interface 205 is mechanically and/or electronically connected (via wire/cable and/or wirelessly) to various components within the dropper seatpost assembly 50. When the rider moves the rider interface 205, via the connections between the rider interface 205 and the dropper seatpost assembly 50, she is causing a change in mechanical or hydraulic state within the dropper seatpost assembly 50 allowing a change in saddle position relative to the bike frame 119.

Referring now to FIGS. 1 and 2, in one embodiment, dropper seatpost assembly 50 includes a cable actuator interface. In one embodiment, a control cable couples the cable actuator interface with the rider interface 205. In general, the control cable can be internally routed, externally routed, or partially internally and externally routed.

For example, in one embodiment of an internally routed control cable configuration, the control cable is affixed to the rider interface 205 and will be run internally through bike frame 119 where it will be accessible at seat post opening 93. The control cable is then coupled with the cable actuator interface of dropper seatpost assembly 50 and will remain within the frame 119 when the dropper seatpost assembly 50 is inserted into seat post opening 93.

In contrast, in one embodiment of an externally routed control cable configuration, the control cable is affixed to the rider interface 205 and will run externally along a portion of bike frame 119 and the control cable with couple with cable actuator interface outside of the bike frame 119 when dropper seatpost assembly 50 is installed on the bike 20.

In the case of a partially internally and externally routed control cable, in one embodiment, as the control cable traverses between dropper seatpost assembly 50 and rider interface 205 portions of the control cable can be internal to the frame 119 and external to the frame 119.

Figure 3:
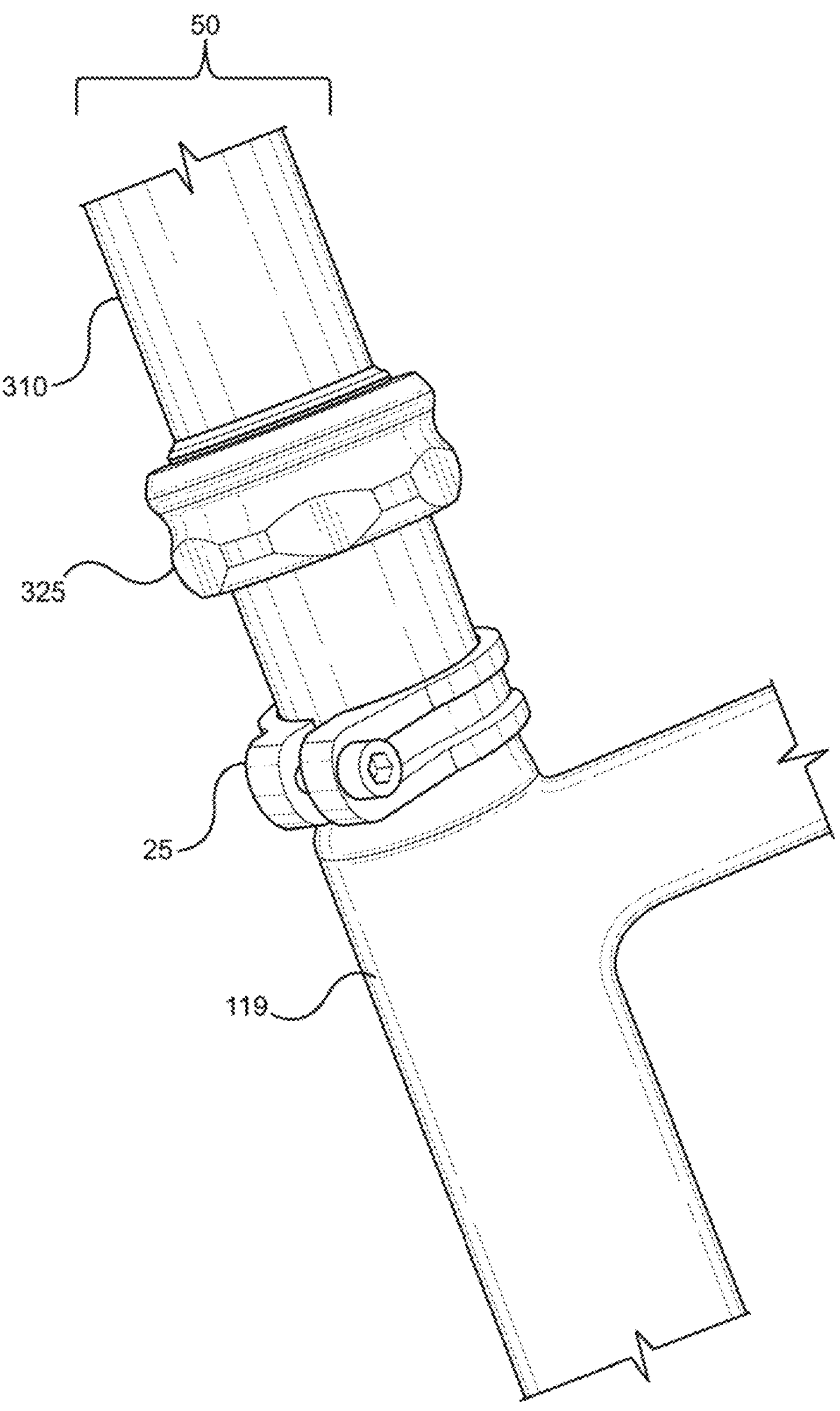
FIG. 3 is a partial perspective view of the dropper seatpost assembly installed in the seatpost retaining portion of the bike frame of FIG. 1, in accordance with an embodiment.

FIG. 3 is a partial perspective view of a portion of dropper seatpost assembly 50 installed in the bike frame 119 of FIG. 1. In one embodiment, dropper seatpost assembly 50 includes a seatpost collar 325 that is used to limit the distance the dropper seatpost assembly 50 can enter the seat post opening 93 in bike frame 119.

Figures 4A, 4B:
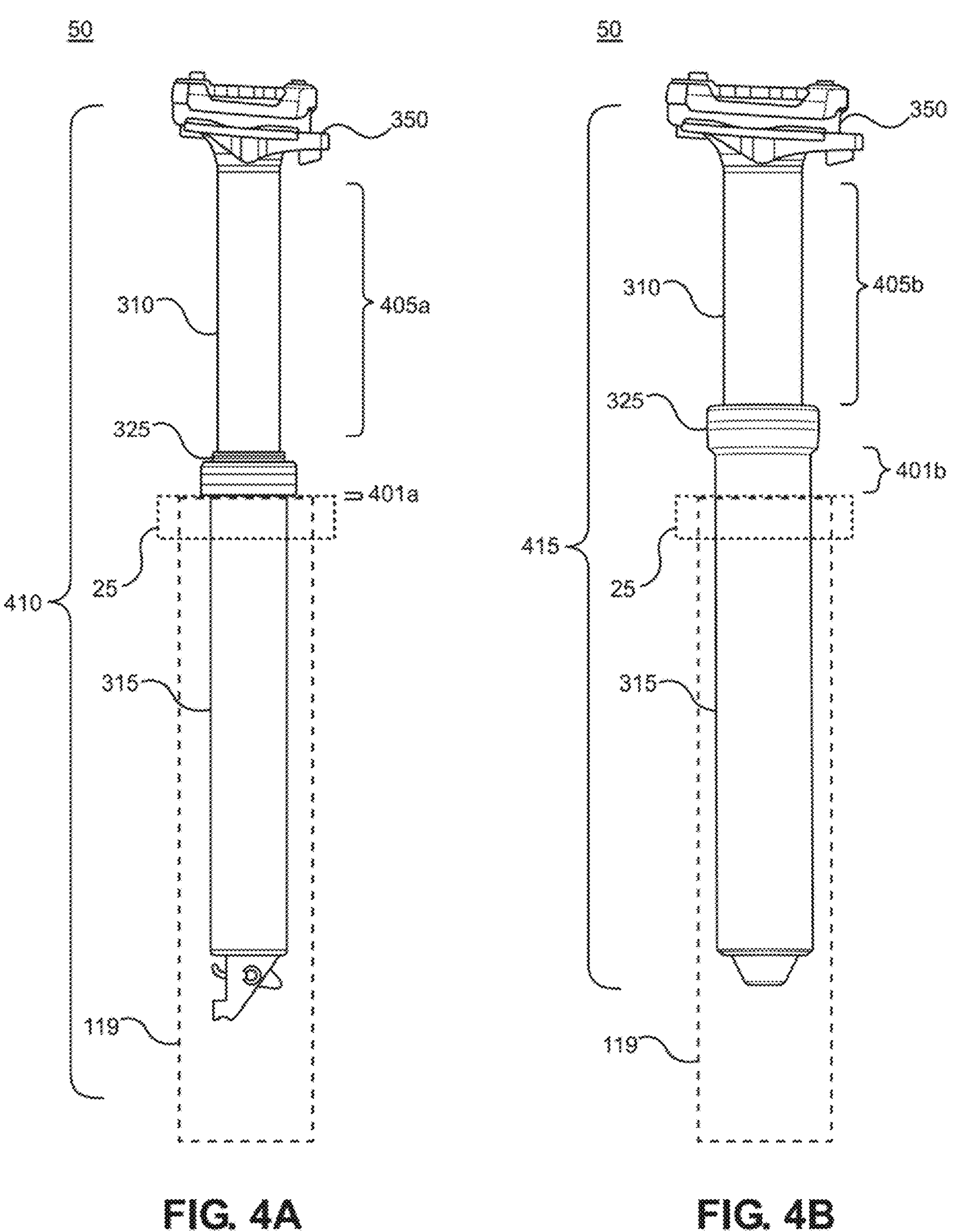
FIG. 4A is a perspective view of a dropper seatpost assembly, in accordance with an embodiment.
FIG. 4B is a perspective view of a dropper seatpost assembly having a different overall length than the dropper seatpost assembly of FIG. 4A, in accordance with an embodiment.

FIG. 4A is a perspective view of a dropper seatpost assembly 50 shown in accordance with an embodiment. In one embodiment, the dropper seatpost assembly 50 includes an upper post 310, a head assembly 350, a lower post 315, and a seatpost collar 325. FIG. 4A also shows an overall length 410, an upper seatpost extended length 405*a*, and a seating distance 401*a* that indicates the distance between seatpost retaining clamp 25 and seatpost collar 325.

Referring now to FIGS. 3 and 4A, in one embodiment, seatpost retaining clamp 25 is used to provide a clamping pressure on the seat post opening 93 of bike frame 119 such that the lower post of dropper seatpost assembly 50 is held fast in both insertion depth and head assembly 350 (and thus saddle 10) orientation.

In other words, the seatpost retaining clamp 25 is loosened to allow the rider to slip-fit (e.g., insert, remove, and orient) the lower post 315 of dropper seatpost assembly 50 into seat post opening 93 of bike frame 119 and once the dropper seatpost assembly 50 is oriented in the proper position, the seatpost retaining clamp 25 is tightened to maintain the orientation of dropper seatpost assembly 50 with respect to bike frame 119.

In one embodiment, the orientation of the dropper seatpost assembly 50 is based on the design of dropper seatpost assembly 50 with respect to the forward and rear of bike frame 119. For example, instead of a linear seatpost design as shown in FIG. 4A, in one embodiment, a portion of the dropper seatpost assembly (such as a top portion of upper post 310) will include a geometric feature to allow the saddle to be mounted to the head assembly 350 offset vertically from the seat post opening 93. For example, the offset may be a curve or other geometric feature that provides an offset saddle location of 1 or more centimeters rearward with respect to the location of seat post opening 93. Although an offset saddle location is described as being rearward, it should be appreciated that in one embodiment, the offset may be in a forward facing direction, e.g., toward the front (or handlebars 200) of bike 20.

In one embodiment, the orientation of the dropper seatpost assembly 50 is based on the orientation of saddle 10 with respect to the bike frame 119. For example, the saddle 10 is oriented in a plane approximately parallel to the plane of bike frame 119. In other words, the front and rear of saddle 10 are similarly oriented with the front and rear of bike frame 119. In one embodiment, the saddle 10 orientation is adjusted by the rider.

Once the dropper seatpost assembly 50 is inserted into seat post opening 93 of bike frame 119 and the saddle 10 is properly oriented, the seatpost retaining clamp 25 is then tightened down to "lock" the dropper seatpost assembly 50 into the selected lower post height and saddle 10 orientation. In one embodiment, the "lock" consists of seatpost retaining clamp 25 applying a pressure about seat post opening 93 of bike frame 119 which reduces the size of seat post opening 93 of bike frame 119 causing a frictional coupling of lower post 315 with bike frame 119.

In one embodiment, the upper post of dropper seatpost assembly 50 extends upwards from the bike frame 119 to the head assembly 350 to which the saddle 10 is attached (as indicated by upper seatpost extended length 405*a*). Dropper seatpost assembly 50 may be made of various materials, such as, but not limited to: steel, aluminum, titanium, carbon fiber, a composite material, and aluminum wrapped in carbon fiber, etc.

In one embodiment, the location of seatpost collar 325 is fixed at or about the point of telescopic interaction between the upper post 310 and the lower post 315 of dropper seatpost assembly 50. In one embodiment, the lower post 315 is inserted into seat post opening 93 of bike frame 119 until the seatpost collar 325 reaches seat post opening 93 of bike frame 119 (as indicated by seating distance 401*a*). Once fully inserted, the seatpost retaining clamp 25 is used to frictionally couple dropper seatpost assembly 50 with bike frame 119.

In one embodiment, the upper post 310 telescopically slides with respect to lower post 315 upon actuation of rider interface 205 (of FIGS. 1-3). Thus, the upper post 310 can move up and down to adjust saddle height, while the lower post 315 of dropper seatpost assembly 50 is retained with respect to the frame 119 by seatpost clamp 25. Thus, once oriented by the rider, seatpost retaining clamp 25 does not allow lower post 315 to move (rotationally or vertically) with respect to the bike frame 119.

In another embodiment, the dropper seatpost assembly 50 is inverted. That is, the upper post 310 telescopically slides about the exterior of lower post 315 upon actuation of rider interface 205 (of FIGS. 1-3). Thus, the upper post 310 can move up and down to adjust saddle height, while the lower post 315 of dropper seatpost assembly 50 is retained with respect to the frame 119 by seatpost clamp 25. Thus, once oriented by the rider, seatpost retaining clamp 25 does not allow lower post 315 to move (rotationally or vertically) with respect to the bike frame 119.

Additional details regarding the operation of a dropper seatpost assemblies are found in U.S. Pat. No. 9,422,018 entitled "Seatpost" which is assigned to the assignee of the present application, and which is incorporated herein by reference in its entirety.

Referring now to FIG. 4B, a perspective view of a dropper seatpost assembly 50 having an overall length 415 that is different than the overall length 410 of dropper seatpost assembly 50 of FIG. 4A is shown in accordance with an embodiment. That is, the dropper seatpost assembly 50 of FIG. 4B is an example of a dropper seatpost assembly 50 having one or more different dimensions than that of dropper seatpost assembly 50 of FIG. 4A. For example, in FIG. 4B, the overall length 415 is less than the overall length 410, the upper seatpost extended length 405*b* is less than the upper seatpost extended length 405*a*, and a seating distance 401*b* that indicates the distance between seatpost retaining clamp 25 and seatpost collar 325 is larger than the seating distance 401*a*.

Figure 4D:
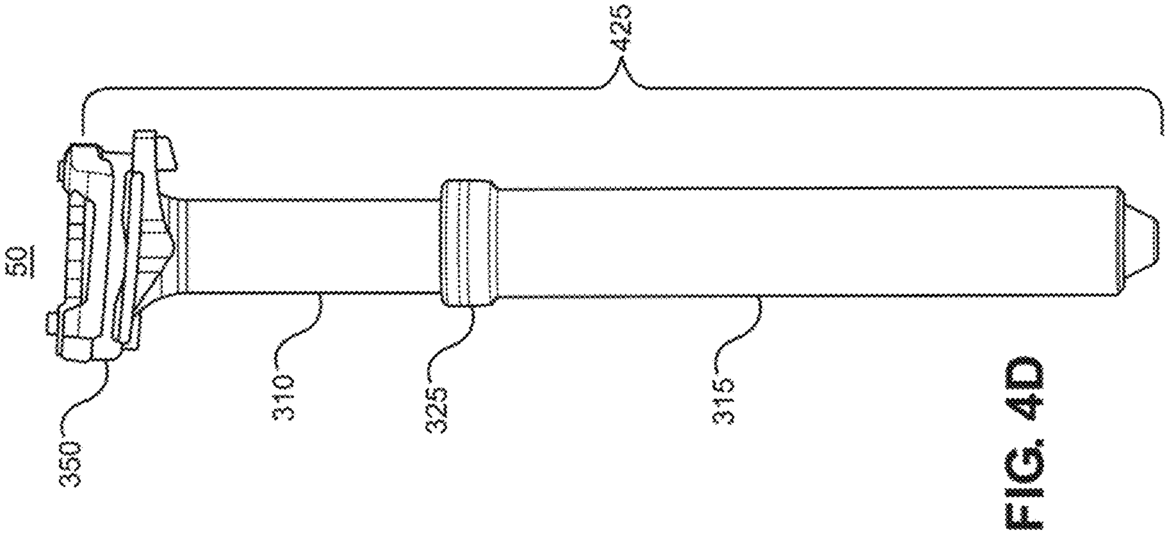
FIG. 4D is a perspective view of the dropper seatpost assembly of FIG. 4A in an extended position, in accordance with an embodiment.
Figure 4C:
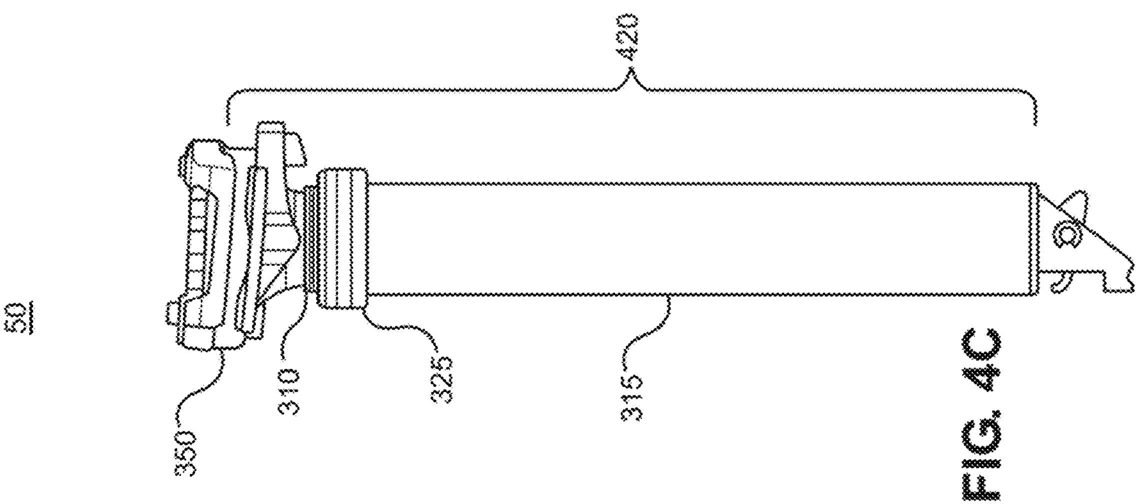
FIG. 4C is a perspective view of the dropper seatpost assembly of FIG. 4A in a contracted position, in accordance with an embodiment.

With reference now to FIG. 4C, a perspective view of dropper seatpost assembly 50 in a compression position 420 is shown in accordance with one embodiment. In one embodiment, dropper seatpost assembly 50 of FIG. 4C illustrates a dropper seatpost assembly at full compression (e.g., the lowest saddle height when the smallest amount of upper post 310 is extended from lower post 315).

In one embodiment, dropper seatpost assembly 50 of FIG. 4C illustrates a partial compressed dropper seatpost assembly. For example, a first rider might have the compressed position 420 of the dropper seatpost assembly 50 (e.g., the exposed length of upper post 310) set at a length of 20 mm instead of the maximum compressed length (e.g., 0 mm, 6 mm, 12 mm, etc.). In contrast, a second rider might have the compressed position 420 of the dropper seatpost assembly 50 (e.g., the exposed length of upper post 310) set at a length of 50 mm instead of the maximum compressed length (e.g., 0 mm, 4 mm, 10 mm, etc.).

Although a number of compressed lengths for the compressed position 420 of dropper seatpost assembly 50 are described, it should be appreciated that other embodiments may include dropper seatpost assemblies with different compressed positions 420 (or different compressed lengths). Similarly, in one embodiment, the dropper seatpost assembly 50 may have a pre-defined number of different selectable compressed positions 420 (e.g., different compressed lengths such as, but not limited to, 0 mm, 5 mm, 8 mm, 20 mm, etc.). In one embodiment, the dropper seatpost assembly 50 may have an “infinite” number of different selectable extension lengths (e.g., anywhere from fully compressed to fully extended) that can be selected and/or set by the rider. Thus, it should be appreciated that in one embodiment, the dropper seatpost assembly 50 is able to be set to any saddle height extension length and any saddle height compression length within the operational range of the dropper seatpost assembly.

With reference now to FIG. 4D, a perspective view of dropper seatpost assembly 50 in an extended position 425 is shown in accordance with one embodiment. In one embodiment, dropper seatpost assembly 50 of FIG. 4D illustrates a full extension of dropper seatpost assembly 50 (e.g., the highest saddle height when the largest amount of upper post 310 is extended from lower post 315).

In one embodiment, dropper seatpost assembly 50 of FIG. 4D illustrates a partial extension of dropper seatpost assembly 50. For example, a first rider might have the extended position 425 of the dropper seatpost assembly 50 (e.g., the exposed length of upper post 310) set at a length of 80 millimeters (mm) but not at a maximum extended length (e.g., 120 mm, 150 mm, 200 mm, etc.). In contrast, a second rider might have the extended position 425 of the dropper seatpost assembly 50 set at a length of 100 mm but not at the maximum extended length (e.g., 120 mm, 150 mm, 200 mm, etc.).

Although a number of extended lengths for dropper seatpost assembly 50 are described, it should be appreciated that other embodiments may include dropper seatpost assemblies with different maximum extended lengths. Similarly, in one embodiment, the dropper seatpost assembly 50 may have a pre-defined number of different selectable extension positions 425 (or extended lengths), e.g., 25 mm, 50 mm, 80 mm, etc. In one embodiment, the dropper seatpost assembly 50 may have an “infinite” number of different selectable extension positions 425 (or extended lengths e.g., anywhere from almost fully compressed all the way to fully extended) that can be selected and/or set by the rider.

In general, when a change in saddle height of saddle 10 is desired, (e.g., due to hills, terrain, aerodynamics, speed, riding style, etc.), a user will cause the dropper seatpost assembly 50 to lower from the user established saddle height to the drop saddle height by triggering rider interface 205 (or another trigger) while the rider also depresses the saddle 10. Typically, the actuating lever of a dropper seatpost will open a valve or latch in the dropper seatpost assembly 50 so that the dropper seatpost assembly 50 can move up or down.

In one embodiment, dropper seatpost assembly 50 has an air spring and while the rider’s weight is used to move it down, the air spring will raise the saddle 10 back to the normal saddle height when the valve or latch internal to the dropper seatpost assembly 50 is opened (such as via rider interface 205). In one embodiment, dropper seatpost assembly 50 is “micro-adjustable”. There are two types of micro-adjustable seatposts: (1) seatposts that can be continuously adjusted to an infinite number of positions; and (2) seatposts that can only be adjusted to a predetermined (preprogrammed) number of positions.

For example, with regard to dropper seatpost assemblies that can only be adjusted to a preprogrammed number of positions, the dropper seatpost assembly adjustment positions may be that of the following three positions: normal, middle, and drop. Generally, the rider prefers that the dropper seatpost assembly 50 be in the normal position during a ride over flat terrain, a road surface, or pedaling up small hills on a road surface. In one embodiment, the rider will adjust the dropper seatpost assembly 50 to the “middle” position when the rider still wants to change a riding position to apply more power to the pedals but only needs the saddle to be partially lowered out of the way. This situation may occur while riding down a gentle hill or when the rider anticipates having to climb a hill immediately after a short decent. In one embodiment, the rider will adjust the dropper seatpost assembly 50 to the drop position when the rider is sprinting, ascending a hill in a standing position, traversing bumpy, rocky, or rough terrain, and/or descending a steep hillside. For example, when descending a steep hill, the rider might want the saddle height in the dropped position so they could position themselves rearward of the saddle. By so doing, the rider changes her center of gravity (CG) (and thus the CG of the bike) rearward. By moving the CG rearward, a more stable and safer downhill riding geometry is achieved.

Referring again to FIGS. 4A and 4B, in one embodiment, for example, the longer dropper seatpost assembly 50 of FIG. 4A has a maximum of 210 mm range for upper seatpost extended length 405*a*. In contrast, the shorter dropper seatpost assembly 50 of FIG. 4B has a maximum of 175 mm range for upper seatpost extended length 405*a*.

Assuming a user has a preferred saddle height of 195 mm above the seatpost clamp 25. In shopping for a dropper seatpost assembly, the user would find dropper seatpost assembly 50 of FIG. 4A with a maximum upper seatpost extended length 405*a* of 210 mm and dropper seatpost assembly 50 of FIG. 4B with a maximum upper seatpost extended length 405*b* of 175 mm. Prior to the travel spacers disclosed herein, in order to achieve the proper height (e.g., 195 mm), the user would not be able to use the 210 mm dropper seatpost assembly of FIG. 4A as even when the seating distance 401*a* was minimized, the seat at full up would be 15 mm to high. As such, the user would have to use the shorter 175 mm dropper seatpost assembly 50 of FIG. 4B and then clamp the seatpost with a seating distance 401*b* of approximately 20 mm such that the saddle was at the desired height (e.g., 175 mm+20 mm=195 mm). However, by using the shorter seatpost, the user would be limited to a maximum travel of 175 mm for their dropper seatpost.

Travel Adjuster

Figure 5:
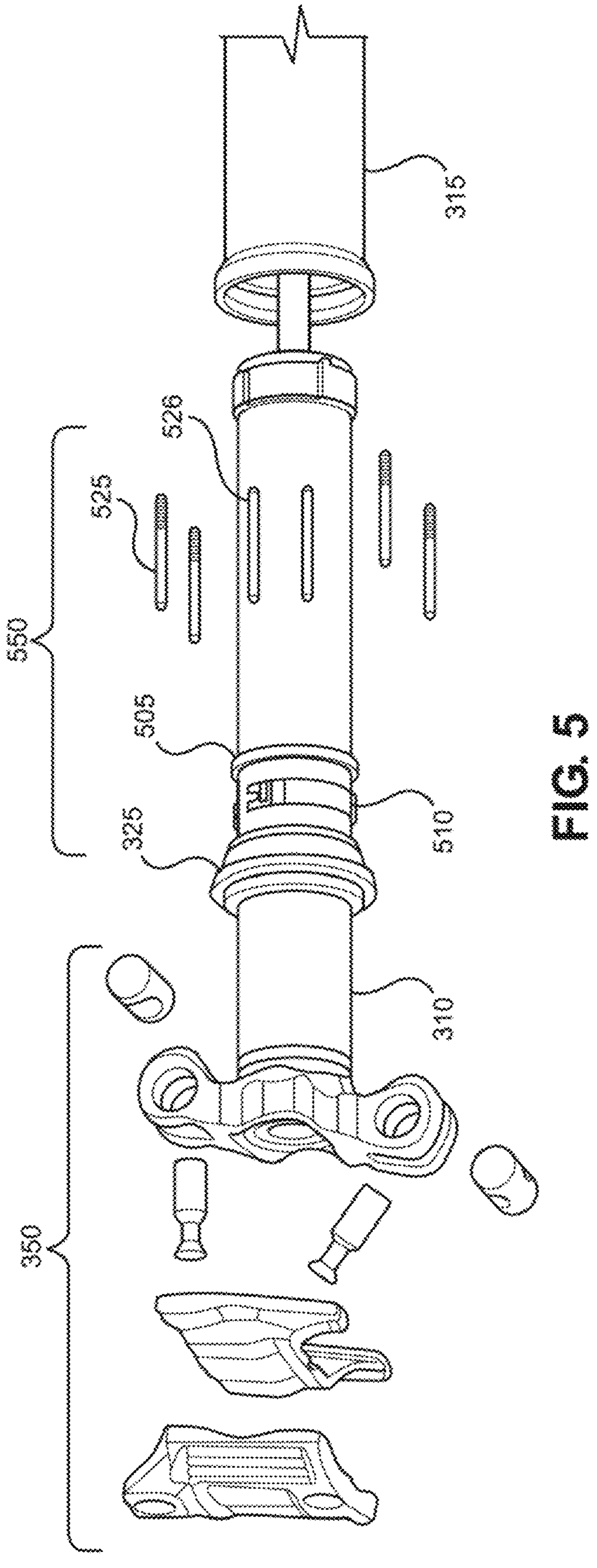
FIG. 5 is an exploded view of the dropper seatpost assembly, in accordance with an embodiment.

With reference now to FIG. 5, an exploded view of a dropper seatpost assembly 50 is shown in accordance with an embodiment. In one embodiment, the dropper seatpost assembly 50 includes head assembly 350, upper post 310, lower post 315, and seatpost collar 325. FIG. 5 also shows a portion of translating assembly 550. In general, translating assembly 550 is used to maintain either or both an axial orientation and/or a rotational orientation of the upper post 310 with respect to the lower post 315. In one embodiment, the translating assembly 550 includes one or more top out pin(s) 525 coupled with top out pin retaining pocket(s) 526 and one or more pin groove(s) 620 formed in lower post 315 (shown in more detail in FIGS. 6E, 7D, and 7E). In one embodiment, the translating assembly 550 includes one or more top out key(s) 925 coupled with top out key retaining pocket(s) 926 and one or more key grooves 1020 formed in lower post 315 (shown in more detail in FIGS. 10A-10B). In one embodiment, the translating assembly 550 includes one or more top out key(s) 925 coupled with top out key retaining pocket(s) 926; one or more top out pin(s) 525 coupled with top out pin retaining pocket(s) 526; one or more pin grooves 620 formed in lower post 315 and one or more key grooves 1020 formed in lower post 315 (shown in more detail in FIGS. 12A and 12B). In one embodiment, the translating assembly 550 includes other types of retaining members other than (or in addition to) pin(s) and key(s), with different geometric shapes, of differing lengths, and the like.

In one embodiment, top out pin(s) 525 are inserted into top out pin retaining pocket(s) 526 formed in upper post 310. In one embodiment, top out pin(s) 525 are alignment pin(s) used to stop angular rotation between the upper post 310 and the lower post 315 (e.g., turning of the saddle). In one embodiment, the top out pin(s) 525 stop angular rotation during regular use of the dropper seatpost assembly 50 and when the seatpost height is changed.

In one embodiment, the top out pin(s) 525 work in conjunction with one or more travel adjust spacer(s) 510 and/or one or more contact washer(s) 505 to modify the operational length of the dropper seatpost. That is, the top out pin(s) 525 work in conjunction with one or more travel adjust spacer(s) 510 and/or one or more contact washer(s) 505 to stop axial movement of the upper post 310 at the maximum extension of the dropper seatpost assembly 50.

In one embodiment, top out pin(s) 525 are made of a material such as, but not limited to, a brass alloy, another metal alloy, plastic, composite material, polymer, stainless steel, aluminum, a combination thereof, or the like.

Figures 6A, 6B:
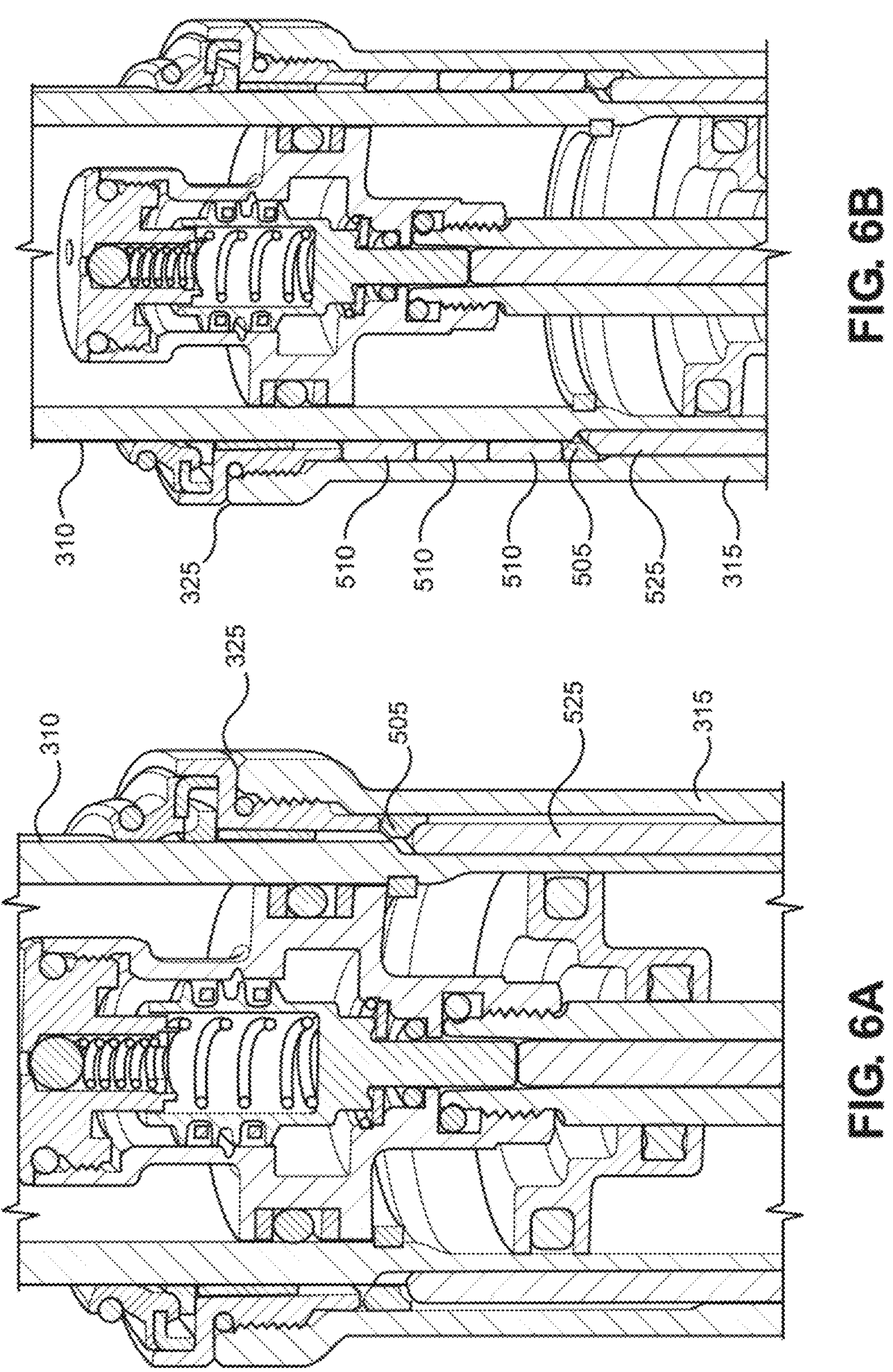
FIG. 6A is a cross-section view of a portion of the dropper seatpost assembly, in accordance with an embodiment.
FIG. 6B is a cross-section view of a portion of the dropper seatpost assembly, in accordance with an embodiment.

Referring now to FIG. 6A, a cross-section view of a portion of the dropper seatpost assembly is shown in accordance with an embodiment. In one embodiment, FIG. 6A includes upper post 310, lower post 315, seatpost collar 325, contact washer(s) 505 (or top out ring), and at least one translating assembly (in this example, one or more top out pin(s) 525).

In FIG. 6B, a cross-section view of a portion of the dropper seatpost assembly is shown in accordance with an embodiment. In one embodiment, FIG. 6B includes the same features as FIG. 6A with the addition of at least one travel adjustment spacer 510.

Figure 6C:
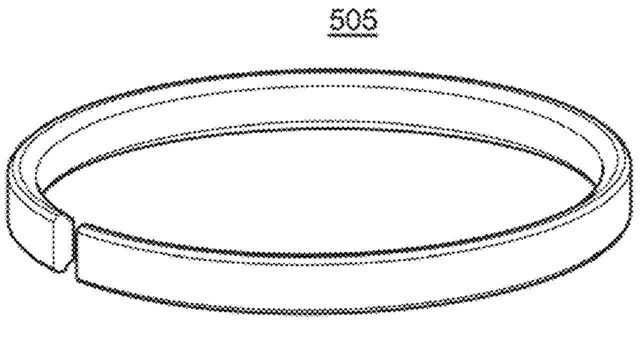
FIG. 6C is a perspective view of the contact washer, in accordance with an embodiment.

Referring now to FIG. 6C, a perspective view of the contact washer(s) 505 is shown in accordance with an embodiment. In one embodiment, contact washer(s) 505 is spring steel. In one embodiment, contact washer(s) 505 is a material such as stainless steel, aluminum, a brass alloy, another metal alloy, plastic, composite material, polymer, a combination thereof, or the like. In one embodiment, contact washer(s) 505 is optional. In one embodiment, there may be two or more contact washer(s) 505.

Figure 6D:
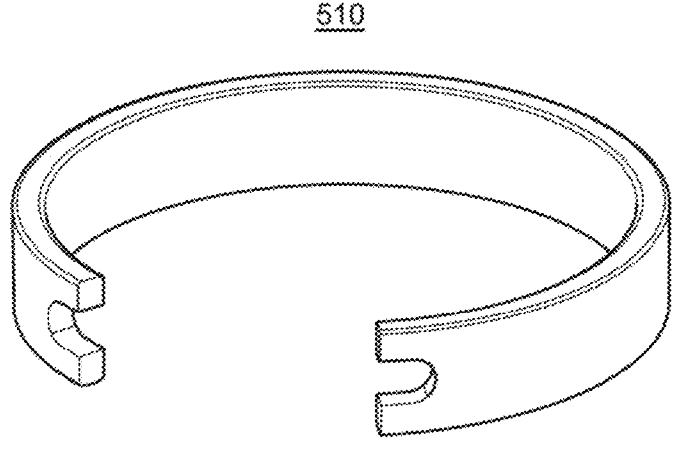
FIG. 6D is a perspective view of the travel adjust spacer, in accordance with an embodiment.

With reference now to FIG. 6D, a perspective view of the travel adjust spacer 510 is shown in accordance with an embodiment. In one embodiment, travel adjust spacer 510 is spring steel. In one embodiment, travel adjust spacer 510 is a material such as stainless steel, aluminum, a brass alloy, another metal alloy, plastic, composite material, polymer, a combination thereof, or the like. In one embodiment, travel adjust spacer 510 is optional. In one embodiment, there may be two or more travel adjust spacer 510.

Figure 6E:
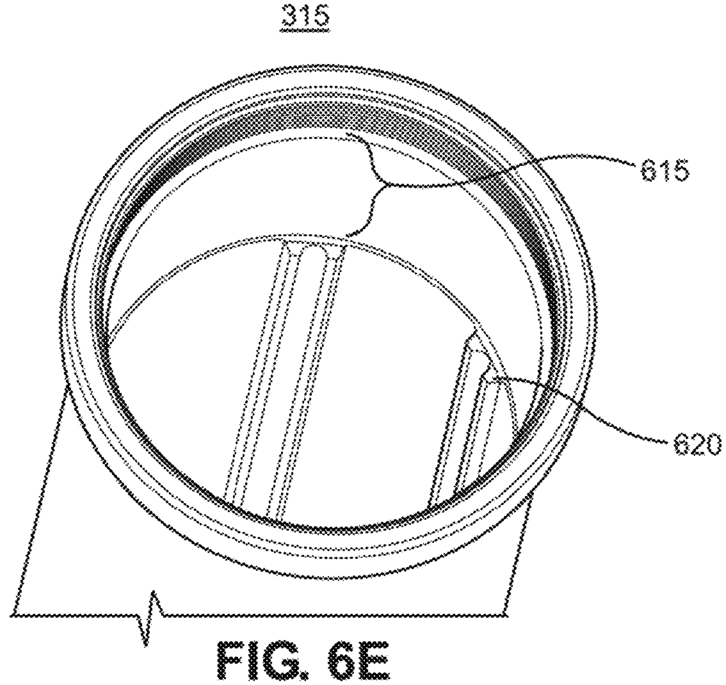
FIG. 6E is a perspective view of the lower post, in accordance with an embodiment.

At FIG. 6E, a perspective view of the lower post 315 is shown in accordance with an embodiment. In one embodiment, lower post 315 includes a travel adjustment bore 615 and one or more pin groove(s) 620.

In one embodiment, the one or more pin groove(s) 620 are positive extrusions (or other positive formation types such as milling, casting, etc.) that run axially along the inner diameter (ID) of lower post 315. In other words, in one embodiment, pin groove(s) 620 are positive grooves that are built up on the ID of lower post 315. By using pin groove(s) 620, the top out pin(s) 525 coupled with upper post 310 are able to run axially along some or all of the length of lower post 315. In one embodiment, the positive extruded pin groove(s) 620 provide additional structure to the interactive operation of the upper post 310 and lower post 315 providing additional rigidity (e.g., a removal of wiggling) to the dropper seatpost assembly 50. In one embodiment, the one or more pin groove(s) 620 are negative extrusions that run axially along the ID of lower post 315. In other words, in one embodiment, pin groove(s) 620 are negative grooves formed by removing material from the ID of lower post 315.

In one embodiment, the positive extrusions for the pin groove(s) 620 on the lower post 315 allow for a lighter dropper seatpost assembly 50 and for additional clearance to reduce the risk of friction between the upper post 310 and the lower post 315. In one embodiment, the positive extrusions for the pin groove(s) 620 add stiffness to the lower post 315 without adding significant additional weight and reduce machining time for removing material for the travel adjust bore 615.

In one embodiment, the one or more pin groove(s) 620 are used to accommodate the one or more top out pin(s) 525 coupled with upper post 310 via top out pin retaining pocket(s) 526. In one embodiment, there may be the same number of pin groove(s) 620 as the number of top out pin(s) 525. In one embodiment, there may be a different number of pin groove(s) 620 with respect to the number of top out pin(s) 525.

In one embodiment, travel adjustment bore 615 is a circumferential bore about the ID of lower post 315 within which one or more travel adjust spacer(s) 510 and/or one or more contact washer(s) 505 are added/removed. In one embodiment, the travel adjustment bore 615 has a constant diameter.

In one embodiment, the travel adjustment spacer(s) 510 and/or any contact washer(s) 505 are a split ring. In one embodiment, the travel adjustment spacer(s) 510 and/or any contact washer(s) 505 are a full ring.

In one embodiment, the travel adjustment spacer(s) 510 and/or contact washer(s) 505 have an outer diameter (OD) that is larger than the ID of the lower post 315 such that when inserted into travel adjustment bore 615 the travel adjustment spacer(s) 510 and/or contact washer(s) 505 provide a spring force against the ID of the outer post thereby retaining the travel adjustment spacer(s) 510 and/or contact washer(s) 505 from moving axially with respect to the travel adjustment bore 615 of lower post 315.

In one embodiment, the travel adjustment spacer(s) 510 and/or contact washer(s) 505 have an OD that is similar to the ID of the lower post 315 such that when inserted the travel adjustment spacer(s) 510 and/or contact washer(s) 505 are able to move within the travel adjustment bore 615 of lower post 315.

In one embodiment, the bottom of the travel adjustment bore 615 (e.g., the end further into the lower post 315) is the beginning of the one or more pin groove(s) 620 while the top of the travel adjustment bore 615 is located below the seat post collar. In one embodiment, the seat post collar 325 is used to retain at least a portion of the upper post 310, any travel adjustment spacer(s) 510 and any contact washer(s) 505 within the lower post 315. In one embodiment seat post collar 325 is threadedly coupled with lower post 315.

In one embodiment, the axial height of travel adjustment bore 615 is determined by the sizes of the different available dropper seatpost assembly 50. For instance, using the above example of an available 210 mm dropper seatpost assembly and a shorter 175 mm dropper seatpost assembly, in one embodiment the axial height of travel adjustment bore 615 for the 210 mm dropper seatpost assembly would be approximately 35 mm. In so doing, any desired saddle height between approximately 175 mm-210 mm would be achievable using the 210 mm dropper seatpost assembly.

By using one or more travel adjustment spacer(s) disclosed herein, the user would be able to install the longer 210 mm dropper seatpost assembly 50 of FIG. 4A and use one or more travel adjustment spacers to reduce the fully extended height of the 210 mm dropper seatpost to the user's preferred saddle height of 195 mm (e.g., an overall travel adjustment reduction of 15 mm). In so doing, the user would have the same extended saddle height as when using the shorter 175 mm dropper seatpost assembly, however, they would now have the longer 195 mm range of movement of dropper seatpost assembly (as opposed to the smaller 175 mm range of movement). Moreover, in one embodiment, by providing a fully bottom seatpost collar 325 to frame 119 seated position (e.g., minimizing seating distance 401*b*), the dropper seatpost assembly would be in a most supported configuration (e.g., fully seated).

Thus, instead of being limited to using a shorter dropper seatpost assembly and adjusting the saddle height of saddle 10 above frame 119 by adjusting the seating distance 401*a*; in one embodiment, the lower post 315 is inserted into seat post opening 93 of bike frame 119 (to the minimum seating distance 401*a*), and the maximum amount of upper post 310 that extends from the dropper seatpost assembly 50 (e.g., the maximum upper seatpost extended length 405*a*) is modified with the use of one or more travel spacers to establish a desired saddle height while also obtaining a maximum range of dropper seatpost operation (e.g., a range covering most or all of the entire length of upper seatpost extended length 405*a*).

With reference again to FIGS. 6A-6E and 7A-7E, in one embodiment, the upper post 310 with one or more top out pin(s) 525 is inserted into the lower post 315 and the one or more top out pin(s) 525 are aligned with the one or more pin groove(s) 620, then the contact washer(s) 505 (optional) and/or the travel adjust spacer(s) 510 are inserted into or removed from the travel adjust bore 615 of the lower post 315.

The seatpost collar 325 is tightened to maintain the installed components. In operation, when the dropper seatpost assembly 50 is in its maximum extended position (or top out condition), the top out pin(s) 525 interface with the contact washer(s) 505 (when present) or with the travel adjust spacer(s) 510 to stop the upward motion of the upper post 310. Similarly, when present, the contact washer(s) 505 interfaces with the travel adjust spacer(s) 510 to define the now adjusted maximum extension height of the dropper seatpost assembly 50.

In general, the number of travel adjust spacer(s) 510 used in the dropper seatpost assembly is based on the size of the travel adjust spacer 510 and the amount of height to be reduced from the maximum extension height of the upper post 310. For example, if the travel adjust spacer 510 is 5 mm high (and referring again to the above example where the user needed to reduce the maximum upper seatpost extended length 405*a* by 15 mm), three 5 mm travel adjust spacer(s) 510 would be installed.

Although a 5 mm height of the travel spacer 510 is used as an example of one embodiment, it should be appreciated that other embodiments would envision one or more travel spacer(s) 510 of a different height, of varying heights, etc. For example, instead of three 5 mm travel adjust spacer(s) 510, there could be one 10 mm travel adjust spacer 510 and one 5 mm travel adjust spacer(s) 510.

In another embodiment, such as when the contact washer(s) 505 is utilized, the height of the contact washer(s) 505 would be included in the travel reduction calculation. For example, if the contact washer(s) 505 is 3 mm high, the spacing arrangement could be one 3 mm contact washer(s) 505 and four 3 mm travel adjust spacer(s) 510. In another example, the spacing arrangement could be one 3 mm contact washer(s) 505 and two 6 mm travel adjust spacer(s) 510. Although a few examples are discussed, it should be appreciated that in one embodiment the arrangement and sizing of the contact washer(s) 505 and/or travel adjust spacer(s) 510 may vary across the available travel adjustment range.

Figures 7A, 7B:
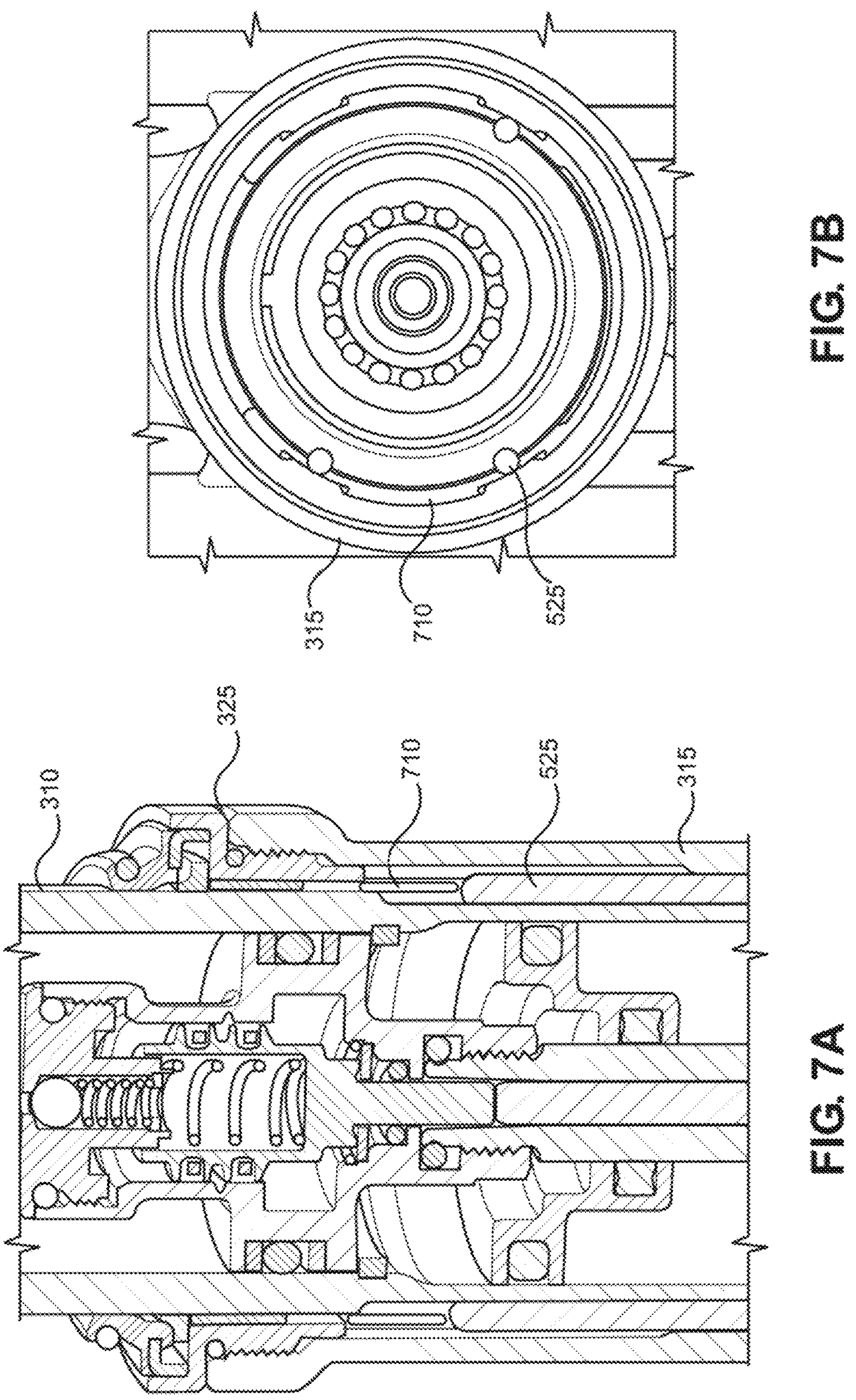
FIG. 7A is a cross-section view of a portion of the dropper seatpost assembly, in accordance with an embodiment.
FIG. 7B is a top sectional view of a portion of the dropper seatpost assembly, in accordance with an embodiment.

Referring now to FIG. 7A, a cross-section view of a portion of the dropper seatpost assembly is shown in accordance with an embodiment. In one embodiment, FIG. 7A is similar in form and function to FIG. 6A and includes upper post 310, lower post 315, seatpost collar 325, and at least one translating assembly (in this example, one or more top out pin(s) 525). For purposes of clarity, only the differences between FIGS. 6A and 7A will be discussed. In FIG. 7A, in one embodiment instead of having a separate contact washer(s) 505 and travel adjust spacer 510, there is a travel adjust spacer 710. In one embodiment, FIG. 7A includes both a separate contact washer(s) 505 and travel adjust spacer 710.

In FIG. 7B, a top sectional view of a portion of the dropper seatpost assembly is shown in accordance with an embodiment. In one embodiment, there are only a few point contacts between the travel adjustment spacer(s) 710 (and/or any contact washer(s)) 505 and the top out pin(s) 525. As shown in FIG. 7B, in one embodiment, the travel adjustment spacer(s) 710 (and/or any contact washer(s) 505) is a split ring.

In one embodiment, the top out pin(s) 525 work in conjunction with one or more travel adjust spacers 710 and/or one or more contact washer(s) 505 to modify the operational length of the dropper seatpost. That is, the top out pin(s) 525 work in conjunction with one or more travel adjust spacers 710 and/or one or more contact washer(s) 505 to stop axial movement of the upper post 310 at the maximum extension of the dropper seatpost assembly 50.

Figure 7C:
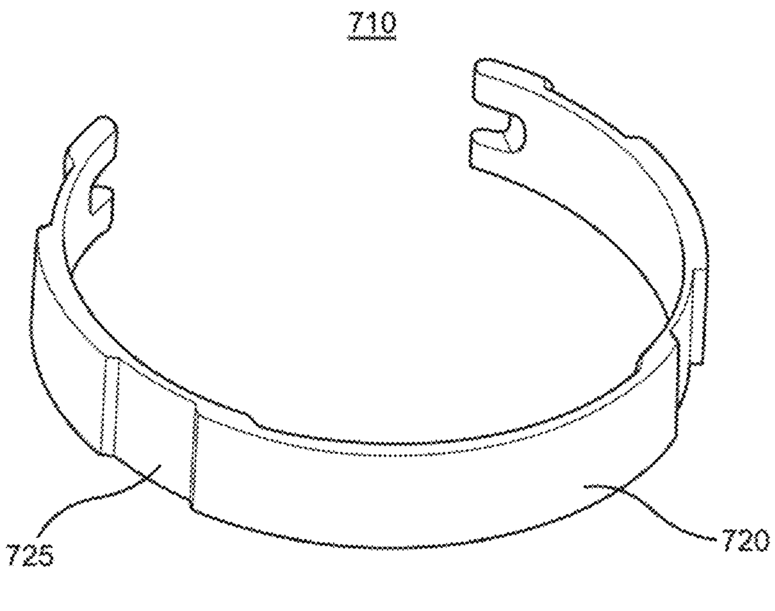
FIG. 7C is a perspective view of the travel adjust spacer, in accordance with an embodiment.

Referring now to FIG. 7C, a perspective view of the travel adjust spacer 710 is shown in accordance with an embodiment. In one embodiment, travel adjust spacer 710 is spring steel. In one embodiment, travel adjust spacer 710 is a material such as stainless steel, aluminum, a brass alloy, another metal alloy, plastic, composite material, polymer, a combination thereof, or the like. In one embodiment, there may be two or more travel adjust spacers 710.

In one embodiment, travel adjust spacer 710 includes portions with added clearance 720 to provide for better retention of the top out pin(s) 525. In one embodiment, travel adjust spacer 710 includes portions with removed clearance 725 to interact with the travel adjustment bore grooves 730 to provide better rotational orientation retention of travel adjust spacer 710.

Figure 7D:
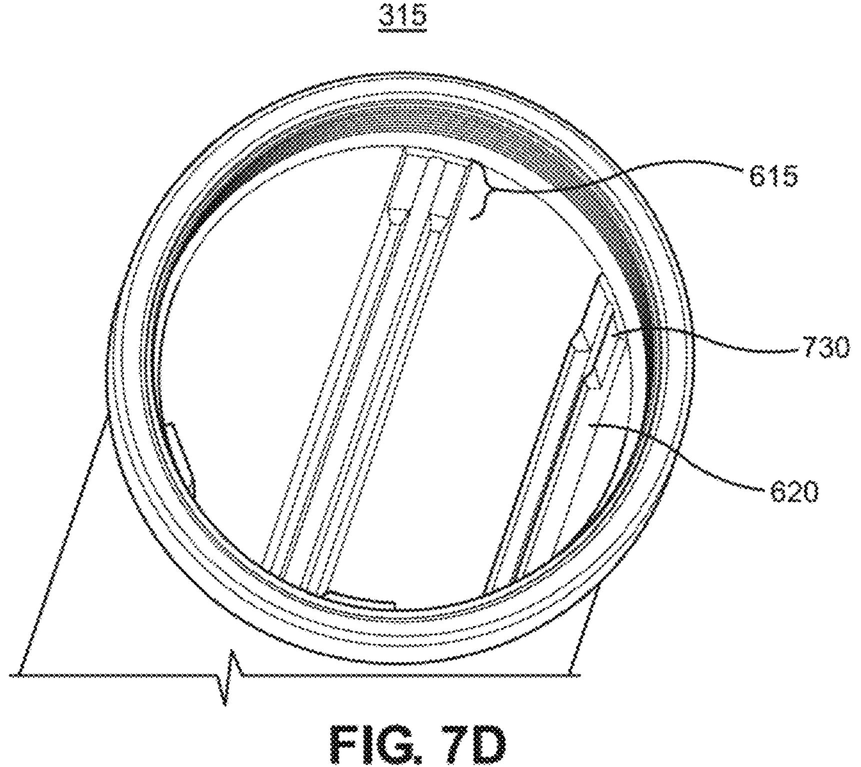
FIG. 7D is a perspective view of the lower post, in accordance with an embodiment.

At FIG. 7D, a perspective view of the lower post 315 is shown in accordance with an embodiment. In one embodiment, lower post 315 includes a travel adjustment bore 615, one or more pin groove(s) 620, and one or more travel adjustment bore grooves 730.

In one embodiment, travel adjustment bore grooves 730 provide better rotational orientation retention of travel adjust spacer 710, the interaction between the travel adjustment spacer 710 and the top out pin(s) 525 can be controlled to ensure they occur at the portions with added clearance 720 of travel adjust spacer 710.

In one embodiment, the one or more pin groove(s) 620 and the one or more travel adjustment bore grooves 730 are positive extrusions (or other positive formation types such as milling, casting, etc.) that run axially along the ID of lower post 315. In other words, in one embodiment, pin groove(s) 620 and one or more travel adjustment bore grooves 730 are positive grooves that are built up on the ID of lower post 315. By using pin groove(s) 620, the top out pin(s) 525 coupled with upper post 310 are able to run axially along some or all of the length of lower post 315. In one embodiment, the positive extruded pin groove(s) 620 provide additional structure to the interactive operation of the upper post 310 and lower post 315 providing additional rigidity (e.g., a removal of wiggling) to the dropper seatpost assembly 50. In one embodiment, the one or more pin groove(s) 620 are negative extrusions that run axially along the ID of lower post 315. In other words, in one embodiment, pin groove(s) 620 are negative grooves formed by removing material from the ID of lower post 315.

In one embodiment, the positive extrusions for the pin groove(s) 620 on the lower post 315 allow for a lighter dropper seatpost assembly 50 and for additional clearance to reduce the risk of friction between the upper post 310 and the lower post 315. In one embodiment, the positive extrusions for the pin groove(s) 620 add stiffness to the lower post 315 without adding significant additional weight and reduce machining time for removing material for the travel adjust bore 615. In one embodiment, when the pin groove(s) 620 are positively extruded, "puck" bushings, or non-360 degree bushings may be used.

In one embodiment, the one or more pin groove(s) 620 are used to accommodate the one or more top out pin(s) 525 coupled with upper post 310. In one embodiment, there may be the same number of pin groove(s) 620 as the number of top out pin(s) 525. In one embodiment, there may be a different number of pin groove(s) 620 with respect to the number of top out pin(s) 525.

Figures 7E, 7F:
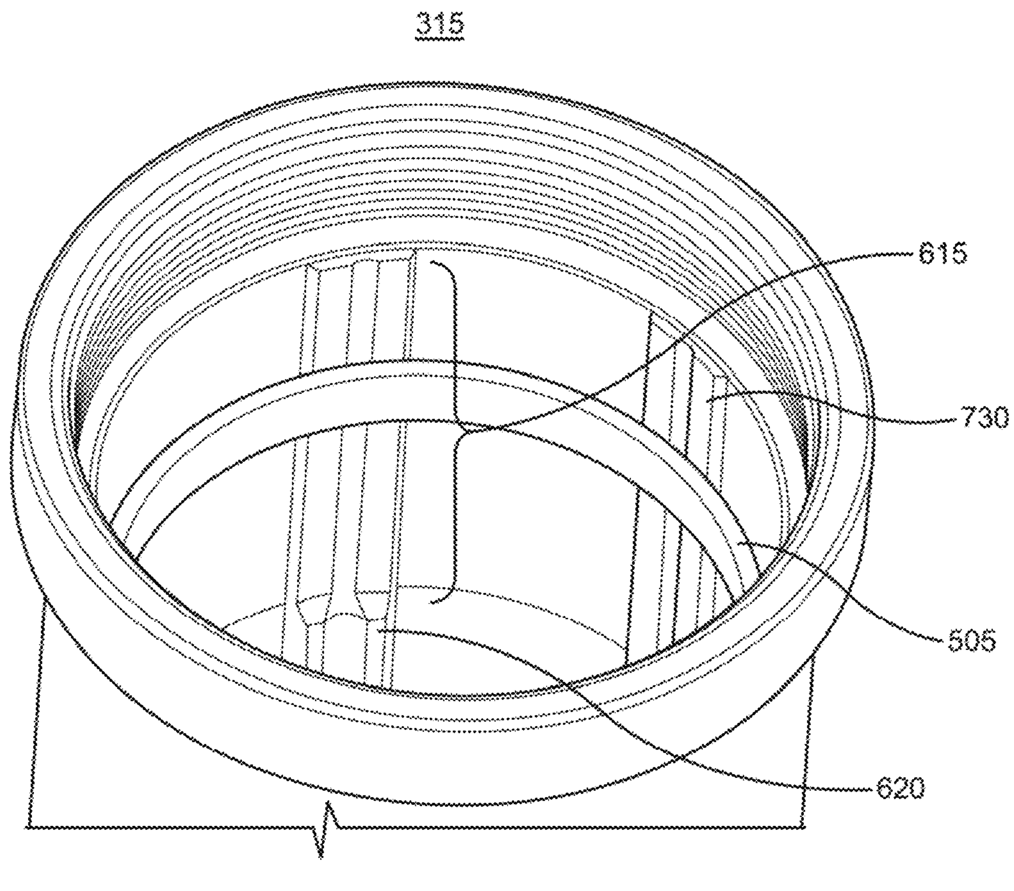
FIG. 7E is a perspective view of the lower post, in accordance with an embodiment.
FIG. 7F is a top view of the lower post of FIG. 7E, in accordance with an embodiment.

In one embodiment, travel adjustment bore 615 is similar to that described in conjunction with FIGS. 6A-6E, and as such, the description of which is not repeated for purposes of clarity. For example, in FIG. 7E, a perspective view of the lower post 315 is shown in accordance with an embodiment. In general, FIG. 7E is similar to FIG. 7D except is has a longer travel adjustment bore 615 height. However, FIG. 7E, provides an example of being able to use at least one travel adjustment spacer 510 and/or at least one travel adjustment spacer 710 interchangeably or in combination within the travel adjustment bore 615 to modify the maximum travel height of the dropper seatpost assembly 50. In other words, the at least one travel adjustment spacer 510 can be used in the modified travel adjustment bore 615 with travel adjustment bore grooves 730. In one embodiment, the lowest travel adjustment spacer would be travel adjustment spacer 710 to provide the most interactive surface with the translation member (e.g., the top out pin(s) 525) and the other travel adjustment spacers may be one or a combination of one or a plurality of travel adjustment spacer(s) 510 and/or travel adjustment spacer(s) 710. In one embodiment, when travel adjustment spacer(s) 710 and/or a contact washer(s) 505 are full rings, which are press fit into a full bore 615 of a single diameter, the full ring spacer(s) and/or washer(s) might not move easily when changing travel adjust. With reference now to FIG. 7F, a top view of FIG. 7E, in embodiments featuring the bore 615 with the travel adjustment bore grooves 730, which are implemented as positive extrusions, there are only a few point contacts between the travel adjustment spacer(s) 510 and/or contact washer(s) 505 and the bore 615. This allows the full ring spacer(s) and/or washer(s) to move more easily when changing travel adjust. In so doing, a full ring contacting positive extrusions of the travel adjustment bore grooves 730 can flex and deform into the open space of the bore 615 between the extrusions.

Figure 8B:
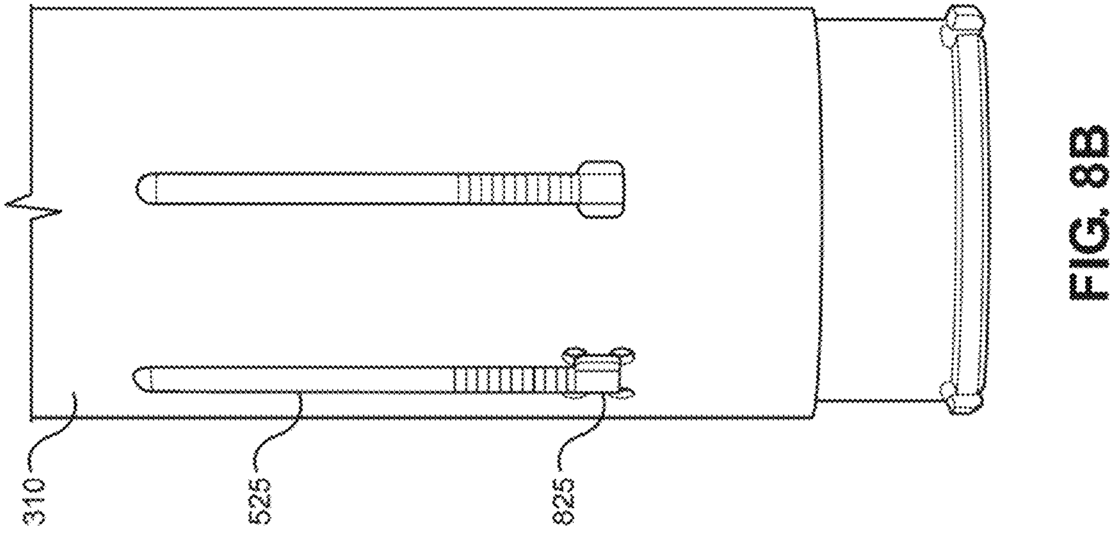
FIG. 8B is a perspective view of the upper post with one or more translating assembly components coupled therewith, in accordance with an embodiment.
Figure 8A:
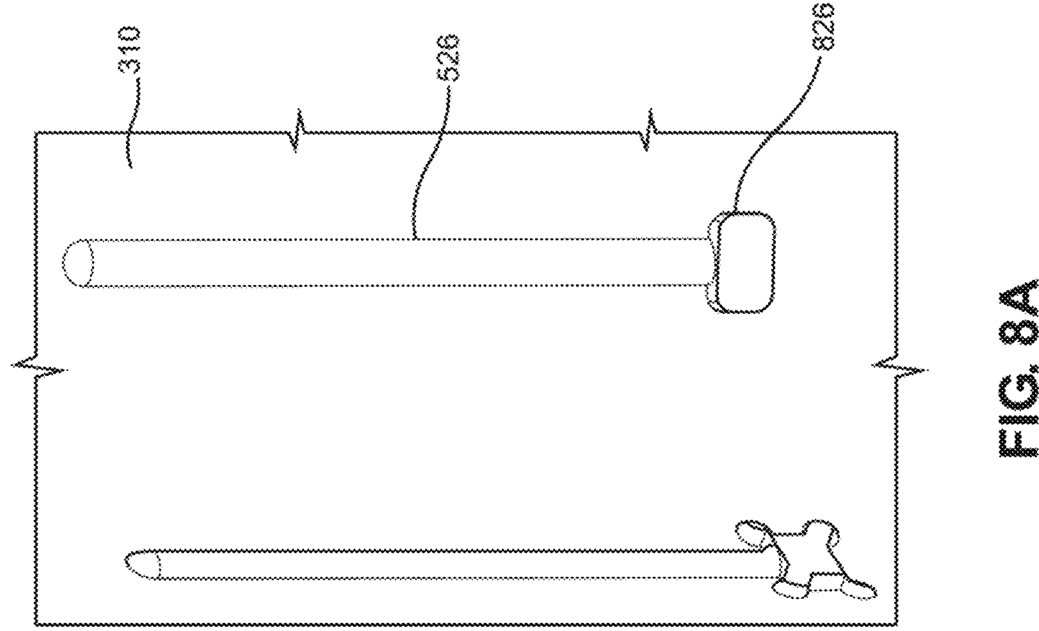
FIG. 8A is a perspective view of the upper post, in accordance with an embodiment.

With reference now to FIG. 8A, a perspective view of the upper post 310 is shown in accordance with an embodiment. In one embodiment, FIG. 8A includes one or more top out pin retaining pocket(s) 526 and one or more top out impact protection pocket(s) 826. Although a number of geometric shapes are shown, it should be appreciated that in another embodiment, the one or more top out impact protection pocket(s) 826 could be other shapes and sizes.

Referring now to FIG. 8B, a perspective view of the upper post 310 with one or more translating assembly components coupled therewith is shown in accordance with an embodiment. In one embodiment, FIG. 8B includes a top out pin(s) 525 in the top out pin retaining pocket(s) 526 of FIG. 8A. FIG. 8B also includes an impact protector(s) 825 in the impact protection pocket(s) 826.

Figure 8C:
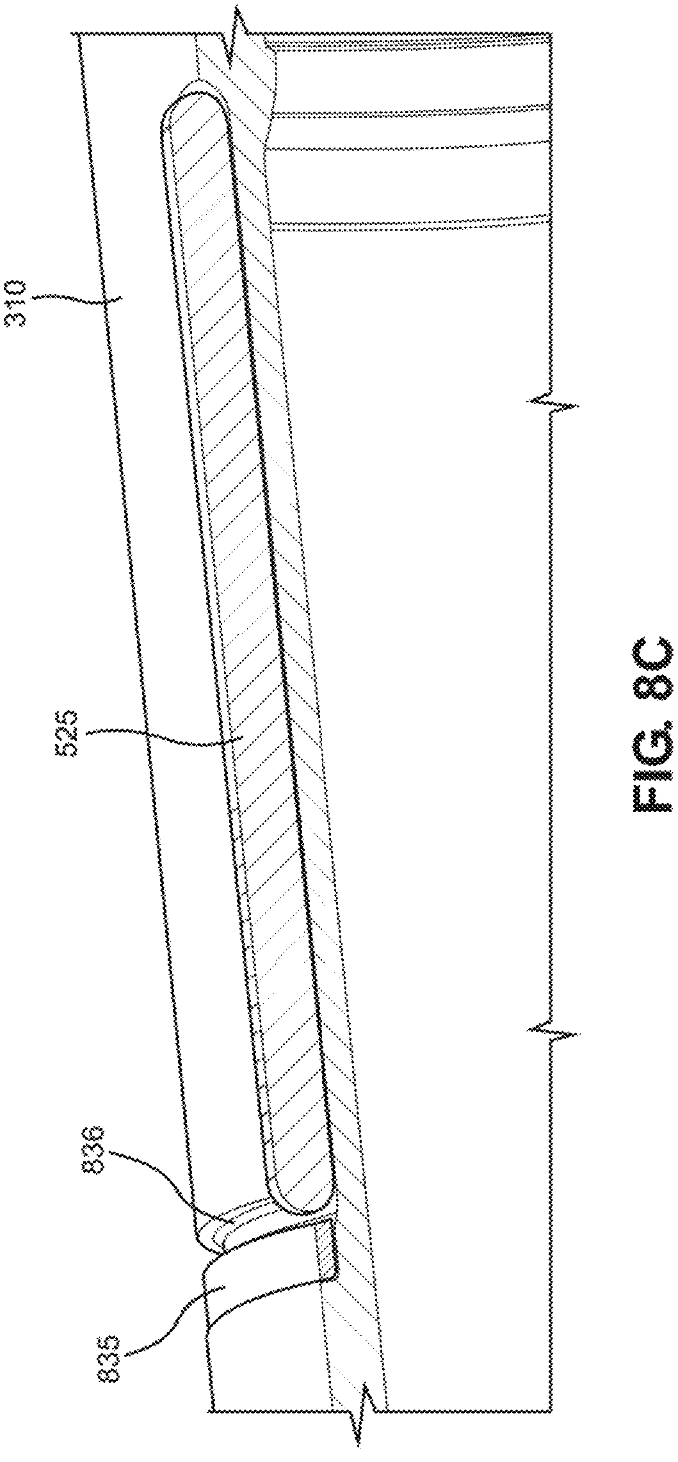
FIG. 8C is a perspective view of the upper post with one or more translating assembly components coupled therewith, in accordance with an embodiment.

With reference now to FIG. 8C, a perspective view of the upper post 310 with one or more translating assembly components coupled therewith is shown in accordance with an embodiment. In one embodiment, FIG. 8C includes a top out pin(s) 525 (in the top out pin retaining pocket(s) 526 of FIG. 8A) and an impact protector ring 835 in the impact protection ring groove 836. In one embodiment, the impact protector ring 835, e.g., a snap ring, a steel ring or the like, where the impact protector ring 835 will distribute the load input from the top out pin(s) 525 across the backside of the impact protection ring groove 836.

Referring now to FIGS. 8A-8C, in one embodiment, the impact protector(s) 825 and/or impact protector ring 835 are provided at the end of the top out pin retaining pocket(s) 526 opposite the travel adjust spacer 510. In one embodiment, the impact protector is used to absorb, disseminate, or otherwise reduce and/or remove any impact forces (such as those generated when the one or more top out pin(s) 525 impact against one or more travel adjust spacer(s) 510 and/or one or more contact washer(s) 505 during the dropper seatpost assembly 50 returning to an extended position) from being passed along the top out pin(s) 525 and into the top out pin retaining pocket(s) 526 of upper post 310 thereby causing damage to one or both of top out pin(s) 525 and/or top out pin retaining pocket(s) 526. The damage could be a burr, scrape, deformation, or the like of one or both of top out pin(s) 525 and/or top out pin retaining pocket(s) 526. In one embodiment, the damage could deleteriously affect the operation of the dropper seatpost assembly 50.

In one embodiment, the impact protector(s) 825 and/or impact protector ring 835 is a sacrificial insert. In one embodiment, the impact protector(s) 825 and/or impact protector ring 835 is made of a material such as, but not limited to, brass alloy, another metal alloy, plastic, composite material, polymer, aluminum, another metal, a combination thereof, or the like. In one embodiment, the impact protector(s) 825 and/or impact protector ring 835 is made of a material that is softer than the material used for the top out pin(s) 525 and/or upper post 310 such that the material of the impact protector(s) 825 and/or impact protector ring 835 deforms before either of the top out pin(s) 525 and/or upper post 310.

In one embodiment, instead of (or in addition to) the impact protector(s) 825 and/or impact protector ring 835, a leadout or relief is formed in top out pin retaining pocket(s) 526 such that the impact between top out pin(s) 525 and top out pin retaining pocket(s) 526 is moved away from the center of the top out pin retaining pocket(s) 526. In one embodiment, the leadout or relief could add an angle such as 30 degrees (or similarly, 15 degrees, 45 degrees, 60 degrees, etc.) to the lower end of top out pin retaining pocket(s) 526 such that when the impact between the top out pin(s) 525 and the one or more travel adjust spacer(s) 510 and/or one or more contact washer(s) 505 is transferred along the top out pin(s) 525, the top out pin(s) 525 can move along the leadout and away from the OD of upper post 310. In other words, the top out pin(s) 525 ends up driving in a little bit such that the top out pin(s) 525 end up moving in the top out pin retaining pocket(s) 526 without causing any damage (or a burr) that could otherwise deleteriously affect the dropper seatpost assembly operation.

Top Out Keys

Figure 9:
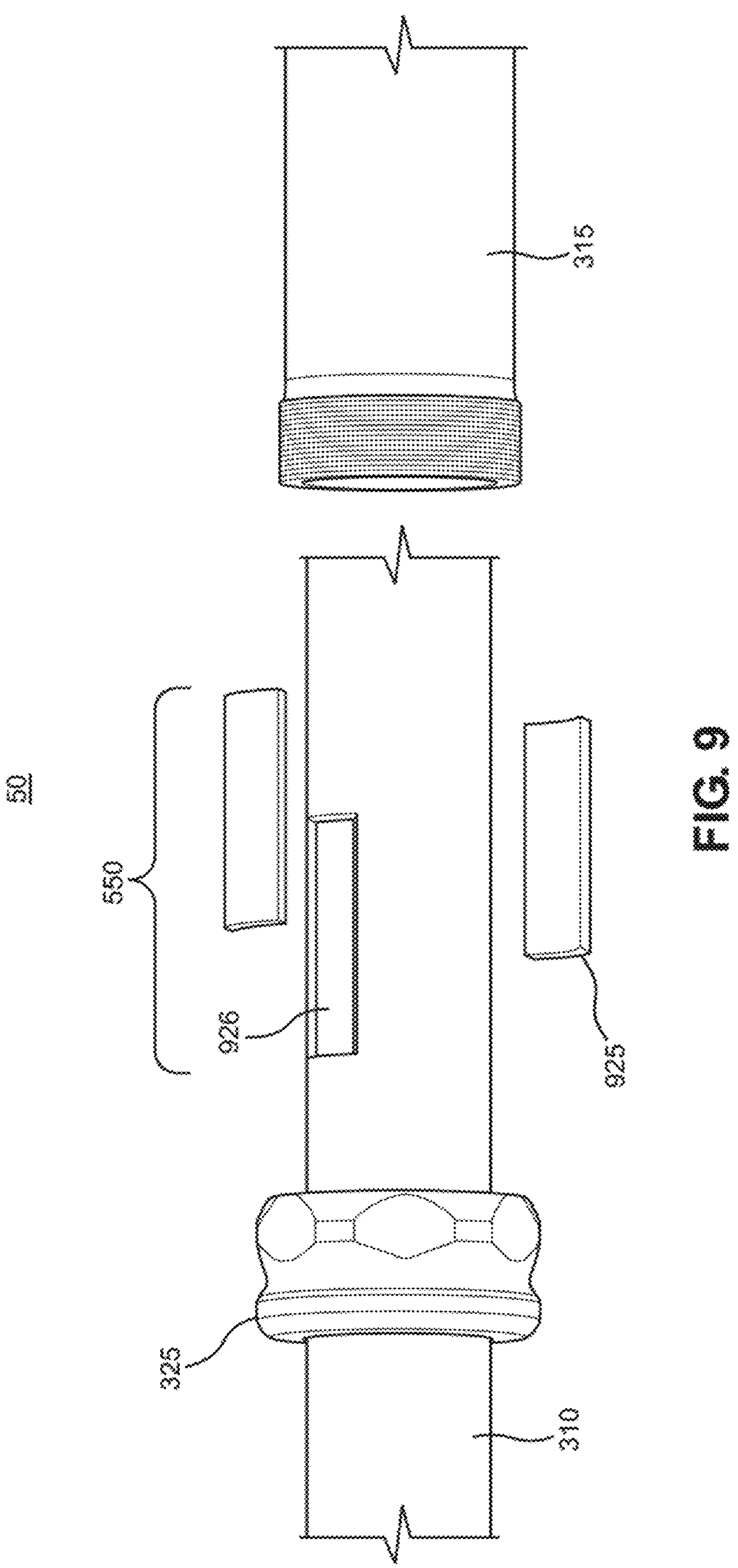
FIG. 9 is an exploded view of a dropper seatpost assembly, in accordance with an embodiment.

With reference now to FIG. 9, an exploded view of a dropper seatpost assembly 50 is shown in accordance with an embodiment. In one embodiment, the dropper seatpost assembly 50 includes upper post 310, lower post 315, and seatpost collar 325. FIG. 9 also shows a portion of translating assembly 550. As stated herein, translating assembly 550 is used to maintain either or both an axial orientation and/or a rotational orientation of the upper post 310 with respect to the lower post 315. In one embodiment, the translating assembly 550 includes one or more top out key(s) 925 coupled with top out key retaining pocket(s) 926 and one or more key grooves 1020 formed in lower post 315 (shown in more detail in FIGS. 10A-10B).

In one embodiment, top out key(s) 925 are inserted into top out key retaining pocket(s) 926 formed in upper post 310. In one embodiment, similar to top out pin(s) 525 discussed herein, top out key(s) 925 are alignment feature(s) used to stop angular rotation between the upper post 310 and the lower post 315 (e.g., turning of the saddle). In one embodiment, the top out key(s) 925 stop angular rotation during regular use of the dropper seatpost assembly 50 and when the seatpost height is changed.

In one embodiment, the top out key(s) 925 work in conjunction with one or more travel adjust spacer(s) 510 and/or one or more contact washer(s) 505 to modify the operational length of the dropper seatpost. That is, the top out key(s) 925 work in conjunction with one or more travel adjust spacer(s) 510 and/or one or more contact washer(s) 505 to stop axial movement of the upper post 310 at the maximum extension of the dropper seatpost assembly 50.

In one embodiment, top out key(s) 925 are made of a material such as, but not limited to, brass alloy, another metal alloy, plastic, composite material, polymer, stainless steel, aluminum, another metal, a combination thereof, or the like.

Figure 10A:
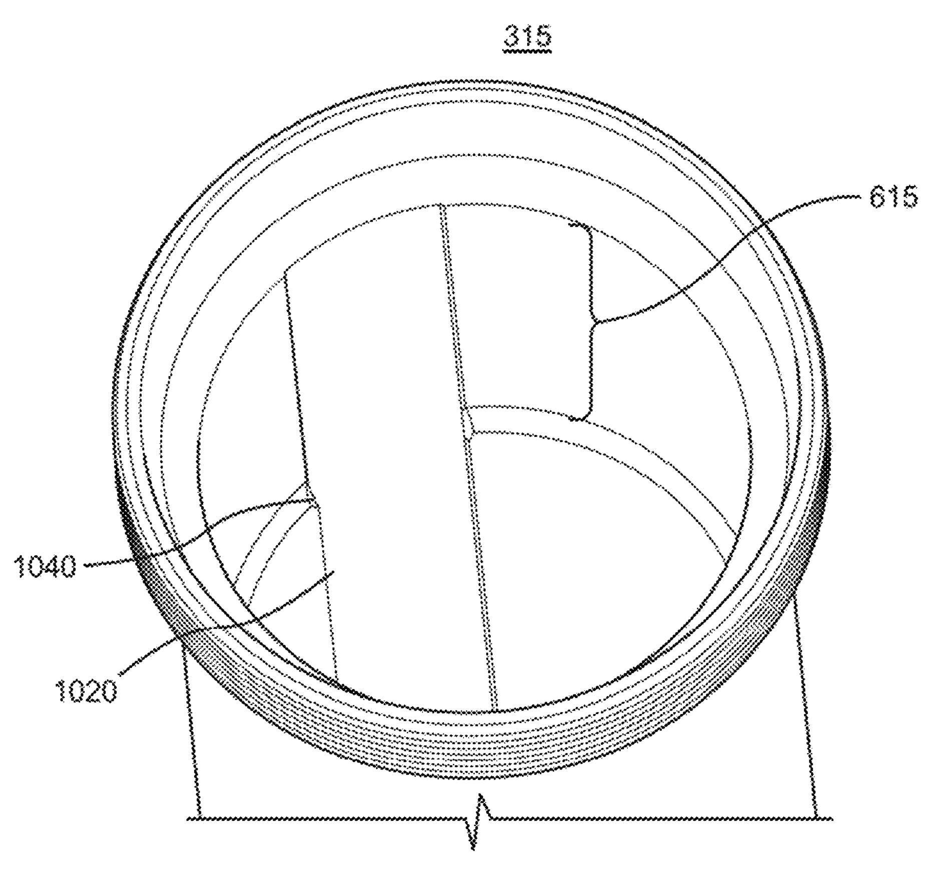
FIG. 10A is a perspective view of the lower post, in accordance with an embodiment.
Figure 10B:
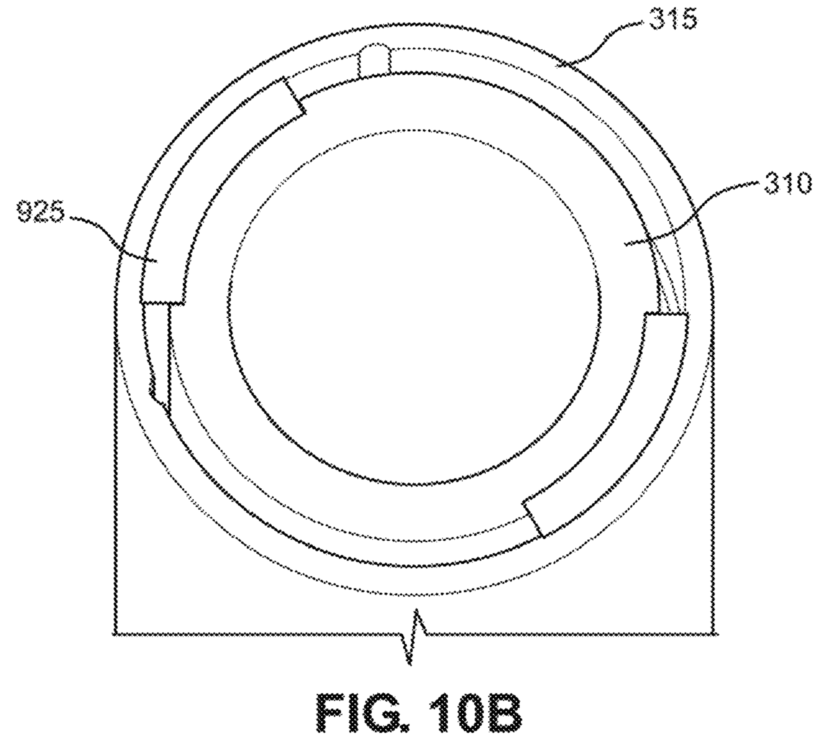
FIG. 10B is a cut away perspective view of the dropper seatpost assembly of FIG. 9, in accordance with an embodiment.

FIG. 10A is a perspective view of the lower post 315 shown in accordance with an embodiment. FIG. 10B is a cut away perspective view of the dropper seatpost assembly of FIG. 9, in accordance with an embodiment. With reference now to FIGS. 10A and 10B, in one embodiment, lower post 315 includes a travel adjustment bore 615 and one or more key groove(s) 1020.

In one embodiment, the one or more key groove(s) 1020 are positive extrusions (or other positive formation types such as milling, casting, etc.) that run axially along the ID of lower post 315. In other words, in one embodiment, key groove(s) 1020 are positive grooves that are built up on the ID of lower post 315. In one embodiment, the one or more key groove(s) 1020 are negative extrusions that run axially along the ID of lower post 315. In other words, in one embodiment, key groove(s) 1020 are negative grooves formed by removing material from the ID of lower post 315. By using key groove(s) 1020, the top out key(s) 925 coupled with upper post 310 are able to run axially along some or all of the length of lower post 315. In one embodiment, the positive extruded key groove(s) 1020 provide additional structure to the interactive operation of the upper post 310 and lower post 315 providing additional rigidity (e.g., a removal of wiggling) to the dropper seatpost assembly 50.

In one embodiment, the one or more key groove(s) 1020 are used to accommodate the one or more top out key(s) 925 coupled with upper post 310 via top out key retaining pocket(s) 926. In one embodiment, there may be the same number of key groove(s) 1020 as the number of top out key(s) 925. In one embodiment, there may be a different number of key groove(s) 1020 with respect to the number of top out key(s) 925.

In one embodiment, travel adjustment bore 615 is similar to travel adjustment bores 615 described in FIGS. 6E, 7D, and 7E. That is, in one embodiment, travel adjustment bore 615 is a circumferential bore about the ID of lower post 315 within which one or more travel adjust spacer(s) 510 and/or one or more contact washer(s) 505 are added/removed. In one embodiment, the travel adjustment bore 615 has a constant diameter.

Figures 16A, 16B:
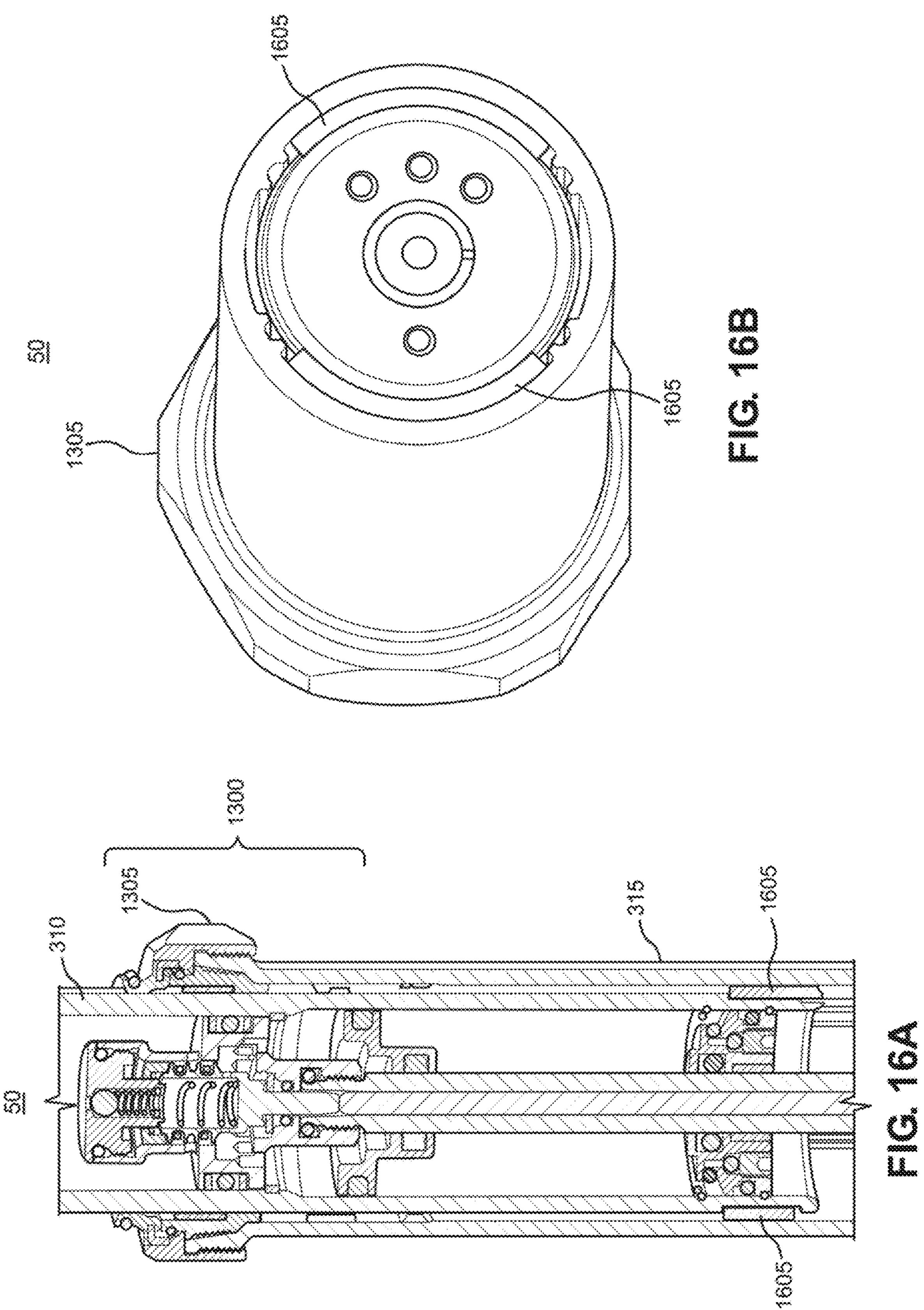
FIG. 16A is a cut-away side view of dropper seatpost assembly with a puck bushing, in accordance with an embodiment.
FIG. 16B is a perspective view of dropper seatpost assembly with a puck bushing, in accordance with an embodiment.

In one embodiment, the travel adjustment spacer(s) 510 and/or any contact washer(s) 505 are a split ring. In one embodiment, the travel adjustment spacer(s) 510 and/or any contact washer(s) 505 are a full ring. In one embodiment, when the one or more key groove(s) 1020 are positively extruded, "puck" bushings 1605, or non-360 degree bushings may be used (as shown in FIG. 16A a cut-away side view of dropper seatpost assembly 50 with at least one puck bushing 1605 and FIG. 16B a perspective view of dropper seatpost assembly 50 with at least one puck bushing 1605).

In one embodiment, the bottom of the travel adjustment bore 615 (e.g., the end further into the lower post 315) is the beginning of the one or more key groove(s) 1020 while the top of the travel adjustment bore 615 is located below the seat post collar. In one embodiment, the seat post collar 325 is used to retain at least a portion of the upper post 310, any travel adjustment spacer(s) 510 and any contact washer(s) 505 within the lower post 315. In one embodiment seat post collar 325 is threadedly coupled with lower post 315.

In one embodiment, although part of the top out key(s) 925 exits key groove(s) 1020 in the lower post 315, some portion of top out key(s) 925 will remain in the key groove(s) 1020, so it doesn't fall out of place. In one embodiment, the amount of top out key(s) 925 that remain in the key groove(s) 1020 is approximately 0.5 inches. In one embodiment, a minimum fully captured insertion of about 0.25 inches will keep top out key(s) 925 from leaving key groove(s) 1020. Depending on the configuration of the dropper seatpost assembly 50, the amount of top out key(s) 925 that remains in the key groove(s) 1020 can be less or more than the above indicated amounts.

In one embodiment, the part of the top out key(s) 925 that exits the key groove(s) 1020 is supported by the OD of the upper post 310 and the ID of the lower post 315 travel adjustment bore 615, otherwise the top out key(s) 925 can fall out of place and jam upon re-entry into the key groove(s) 1020. In one embodiment, approximately 0.010 inch radial gap from the top out key(s) 925 to the ID of lower post 315 will arrest any jamming behavior. In other embodiments, the radial gap can be less or more than approximately 0.010 inch. In one embodiment, part of the key groove(s) 1020 actually remains un-machined outside of the annular travel adjustment bore 615 to ensure the maximum amount of circumferential support for the top out key(s) 925.

Top Out Keys and Pins

Figure 11:
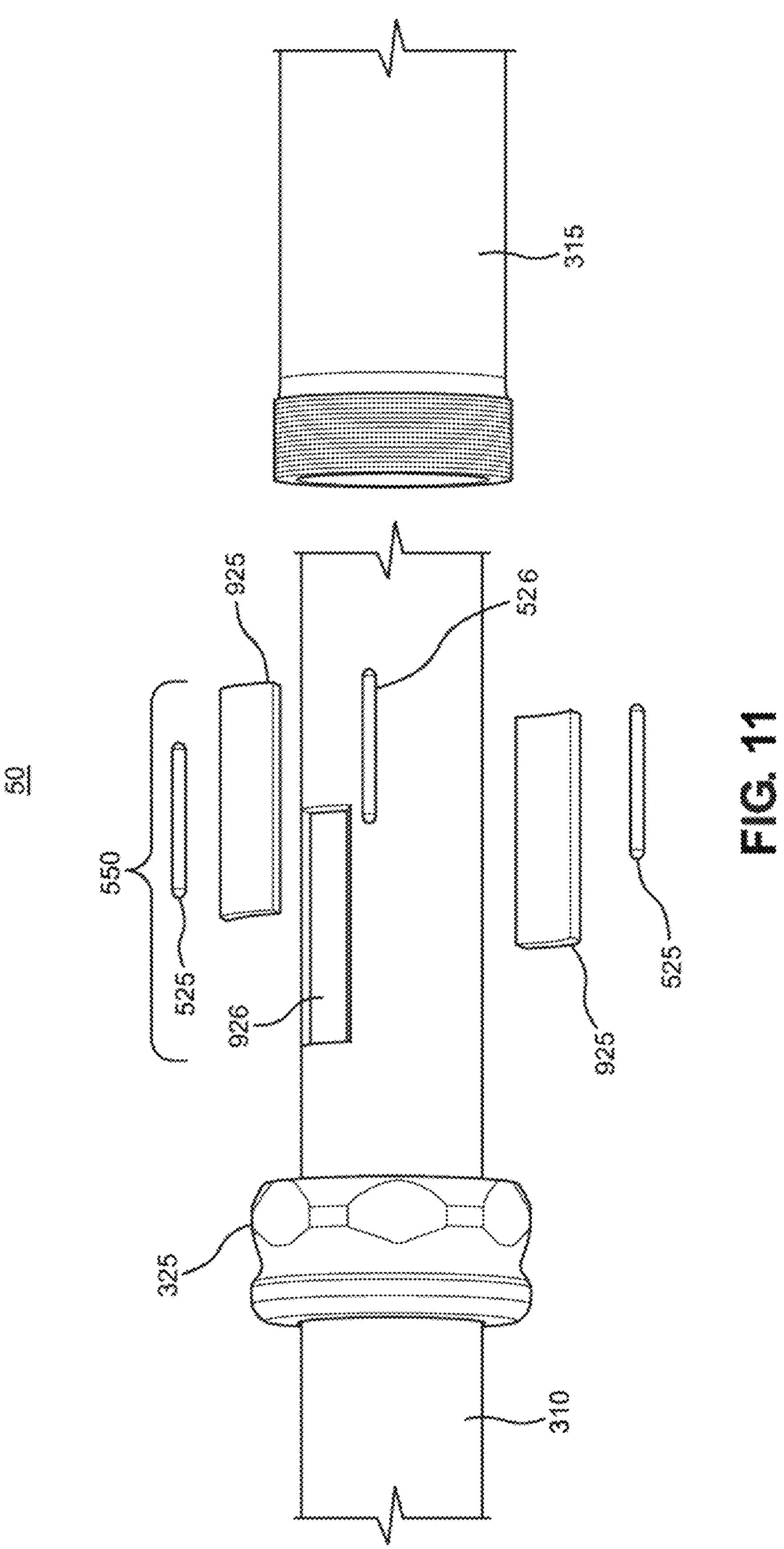
FIG. 11 is an exploded view of a dropper seatpost assembly, in accordance with an embodiment.

With reference now to FIG. 11, an exploded view of a dropper seatpost assembly 50 is shown in accordance with an embodiment. In one embodiment, the dropper seatpost assembly 50 includes upper post 310, lower post 315, and seatpost collar 325. FIG. 11 also shows a portion of translating assembly 550. As stated herein, translating assembly 550 is used to maintain one or both of an axial orientation and/or a rotational orientation of the upper post 310 with respect to the lower post 315. In one embodiment, the translating assembly 550 includes one or more top out key(s) 925 coupled with top out key retaining pocket(s) 926; one or more top out pin(s) 525 coupled with top out pin retaining pocket(s) 526; one or more pin grooves 620 formed in lower post 315 and one or more key grooves 1020 formed in lower post 315 (shown in more detail in FIGS. 12A and 12B).

In one embodiment, top out pin(s) 525 are inserted into top out pin retaining pocket(s) 526 formed in upper post 310 and top out key(s) 925 are inserted into top out key retaining pocket(s) 926 formed in upper post 310.

In one embodiment, top out pin(s) 525 and top out key(s) 925 are alignment feature(s) used to stop angular rotation between the upper post 310 and the lower post 315 (e.g., turning of the saddle). In one embodiment, the top out pin(s) 525 and top out key(s) 925 stop angular rotation during regular use of the dropper seatpost assembly 50 and when the seatpost height is changed.

In one embodiment, the top out pin(s) 525 and top out key(s) 925 work in conjunction with one or more travel adjust spacer(s) 510 and/or one or more contact washer(s) 505 to modify the operational length of the dropper seatpost. That is, the top out pin(s) 525 and top out key(s) 925 work in conjunction with one or more travel adjust spacer(s) 510 and/or one or more contact washer(s) 505 to stop axial movement of the upper post 310 at the maximum extension of the dropper seatpost assembly 50.

In one embodiment, the top out pin(s) 525 are alignment feature(s) used to stop angular rotation between the upper post 310 and the lower post 315 (e.g., turning of the saddle). In one embodiment, the top out pin(s) 525 stop angular rotation during regular use of the dropper seatpost assembly 50 and when the seatpost height is changed. In one embodiment, by making the top out pin(s) 525 alignment feature(s) and not top out features, the top out pin(s) 525 can include a tighter fit and can be located axially lower in the upper post 310, so they don't need to exit into the travel adjust bore 615 of the lower post 315, thereby increasing rotational load carrying ability.

In one embodiment, the top out key(s) 925 work in conjunction with one or more travel adjust spacer(s) 510 and/or one or more contact washer(s) 505 to modify the operational length of the dropper seatpost. That is, the top out key(s) 925 work in conjunction with one or more travel adjust spacer(s) 510 and/or one or more contact washer(s) 505 to stop axial movement of the upper post 310 at the maximum extension of the dropper seatpost assembly 50. In one embodiment, the wider profile of the top out key(s) 925 should distribute impact load and avoid need for upper post 310 and travel adjust spacer 510 impact protection components.

In one embodiment, the top out key(s) 925 are alignment feature(s) used to stop angular rotation between the upper post 310 and the lower post 315 (e.g., turning of the saddle). In one embodiment, the top out key(s) 925 stop angular rotation during regular use of the dropper seatpost assembly 50 and when the seatpost height is changed. In one embodiment, the top out pin(s) 525 work in conjunction with one or more travel adjust spacer(s) 510 and/or one or more contact washer(s) 505 to modify the operational length of the dropper seatpost. That is, the top out pin(s) 525 work in conjunction with one or more travel adjust spacer(s) 510 and/or one or more contact washer(s) 505 to stop axial movement of the upper post 310 at the maximum extension of the dropper seatpost assembly 50.

Figure 12A:
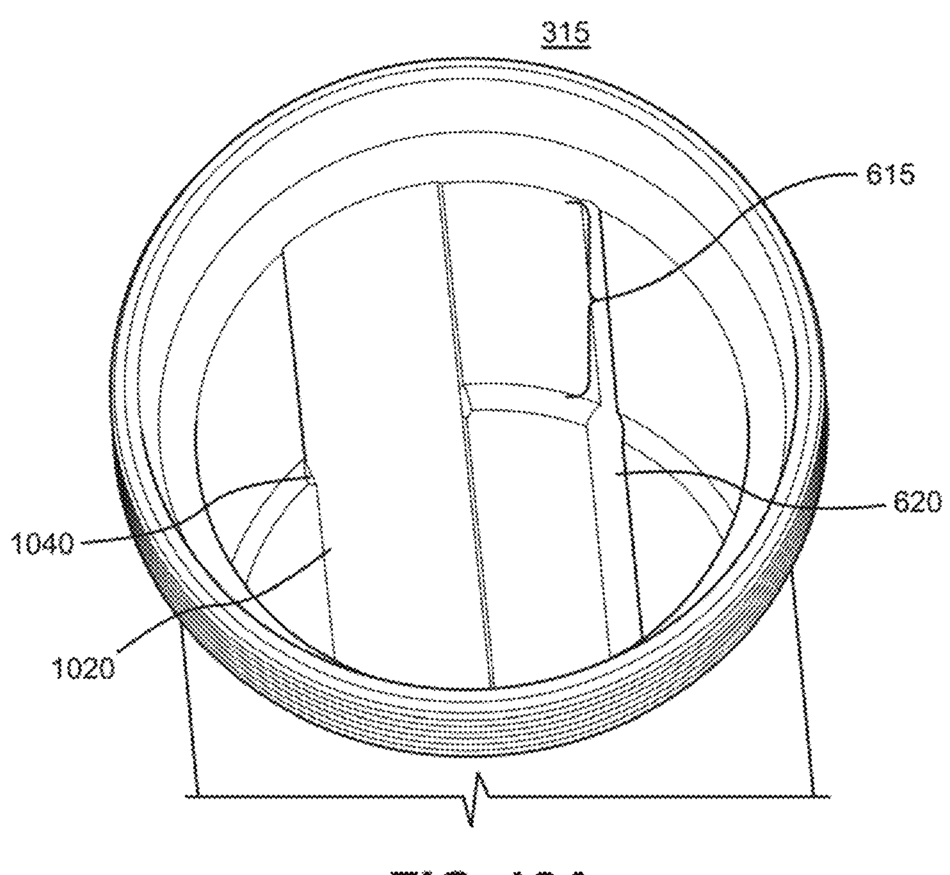
FIG. 12A is a perspective view of the lower post, in accordance with an embodiment.
Figure 12B:
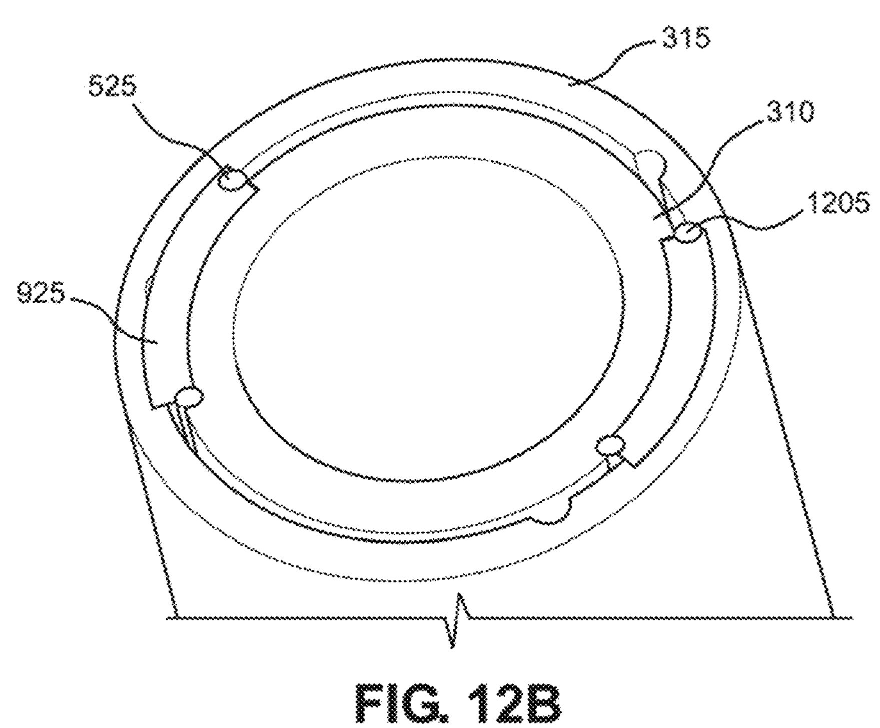
FIG. 12B is a cut away perspective view of the dropper seatpost assembly of FIG. 11, in accordance with an embodiment.

Referring now to FIG. 12A is a perspective view of the lower post 315 shown in accordance with an embodiment. FIG. 12B is a cut away perspective view of the dropper seatpost assembly of FIG. 11, in accordance with an embodiment. With reference now to FIGS. 12A and 12B, in one embodiment, lower post 315 includes a travel adjustment bore 615, one or more key groove(s) 1020, and one or more pin groove(s) 620.

In one embodiment, the one or more pin groove(s) 620 and/or key groove(s) 1020 are positive extrusions (or other positive formation types such as milling, casting, etc.) that run axially along the ID of lower post 315. In other words, in one embodiment, pin groove(s) 620 and/or key groove(s) 1020 are positive grooves that are built up on the ID of lower post 315. In one embodiment, the one or more pin groove(s) 620 and/or key groove(s) 1020 are negative extrusions that run axially along the ID of lower post 315. In other words, in one embodiment, pin groove(s) 620 and/or key groove(s) 1020 are negative grooves formed by removing material from the ID of lower post 315. By using pin groove(s) 620 and key groove(s) 1020, the top out pin(s) 525 and top out key(s) 925 coupled with upper post 310 are able to run axially along some or all of the length of lower post 315. In one embodiment, the positive extruded pin groove(s) 620 provide additional structure to the interactive operation of the upper post 310 and lower post 315 providing additional rigidity (e.g., a removal of wiggling) to the dropper seatpost assembly 50.

In one embodiment, the one or more pin groove(s) 620 and key groove(s) 1020 are used to accommodate the one or more top out pin(s) 525 and top out key(s) 925 coupled with upper post 310 via top out pin retaining pocket(s) 526 and top out key retaining pocket(s) 926.

In one embodiment, there may be the same number of top out pin(s) 525 as the number of top out pin(s) groove(s) 620 and the same number of top out key(s) 925 as the number of top out key groove(s) 1020. In one embodiment, there may be a different number of pin groove(s) 620 and/or key groove(s) 1020 with respect to the number of top out pin(s) 525 and/or top out key(s) 925.

Figure 12C:
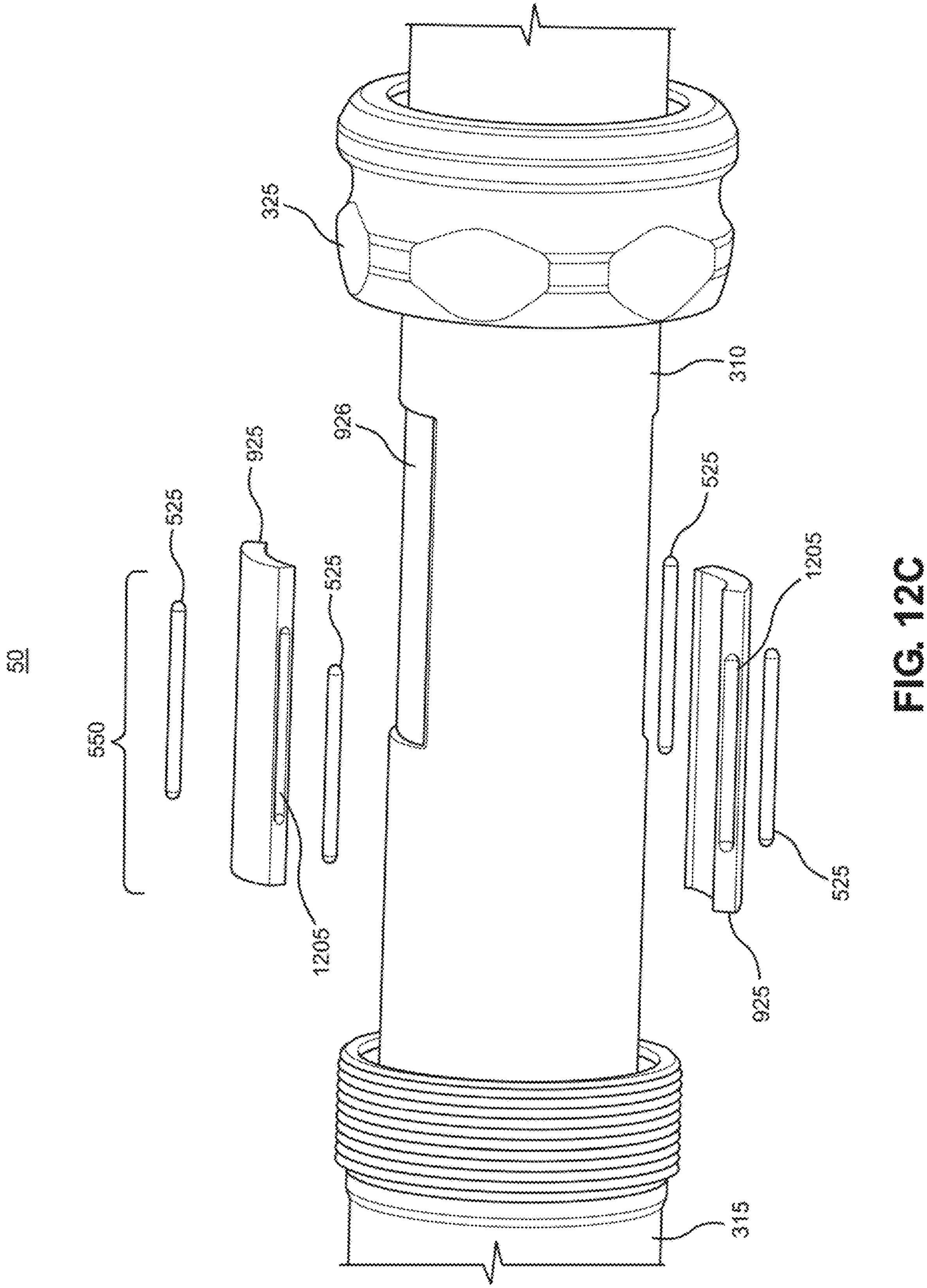
FIG. 12C is an exploded view of a dropper seatpost assembly, in accordance with an embodiment.

With reference now to FIG. 12C, an exploded view of a dropper seatpost assembly 50 is shown in accordance with an embodiment. In general, FIG. 12C is similar to FIG. 11 with the addition of one or more pin groove(s) 1205 in one or more portions of the top out key(s) 925. Instead of (or in addition to) pin groove(s) 526. FIG. 12B shows another embodiment of the pin(s) being located in pin groove(s) 1205.

Referring now to FIGS. 12A-12C, in one embodiment, travel adjustment bore 615 is similar to travel adjustment bores 615 described in FIGS. 6E, 7D, and 7E. That is, in one embodiment, travel adjustment bore 615 is a circumferential bore about the ID of lower post 315 within which one or more travel adjust spacer(s) 510 and/or one or more contact washer(s) 505 are added/removed.

In one embodiment, the bottom of the travel adjustment bore 615 (e.g., the end further into the lower post 315) is the beginning of the one or more pin groove(s) 620 and key groove(s) 1020 while the top of the travel adjustment bore 615 is located below the seat post collar. In one embodiment, the seat post collar 325 is used to retain at least a portion of the upper post 310, any travel adjustment spacer(s) 510 and any contact washer(s) 505 within the lower post 315. In one embodiment seat post collar 325 is threadedly coupled with lower post 315.

In one embodiment, although part of the top out pin(s) 525 and top out key(s) 925 exit the pin groove(s) 620 and key groove(s) 1020 in the lower post 315, some portion of top out pin(s) 525 and top out key(s) 925 will remain in the pin groove(s) 620 and key groove(s) 1020, so they don't fall out of place. In one embodiment, the amount of the top out pin(s) 525 and top out key(s) 925 that remain in the pin groove(s) 620 and key groove(s) 1020 is approximately 0.5 inches. In one embodiment, a minimum fully captured insertion of about 0.25 inches will keep top out pin(s) 525 and top out key(s) 925 from leaving the pin groove(s) 620 and key groove(s) 1020. In one embodiment, depending on the configuration of the dropper seatpost assembly 50, the amount of the top out pin(s) 525 and top out key(s) 925 that remains in the pin groove(s) 620 and key groove(s) 1020 can be less or more than the above indicated amounts.

In one embodiment, the part of the top out pin(s) 525 and top out key(s) 925 that exit the pin groove(s) 620 and key groove(s) 1020 is supported by the OD of the upper post 310 and the ID of the lower post 315 travel adjustment bore 615, otherwise the top out pin(s) 525 and top out key(s) 925 can fall out of place and jam upon re-entry into the pin groove(s) 620 and/or key groove(s) 1020. In one embodiment, approximately 0.010 inch radial gap from the top out pin(s) 525 and top out key(s) 925 to the ID of lower post 315 to arrest any jamming behavior. In another embodiments, the radial gap can be less or more than approximately 0.010 inch. In one embodiment, part of the pin groove(s) 620 and/or key groove(s) 1020 actually remains un-machined outside of the annular travel adjustment bore 615 to ensure the maximum amount of circumferential support for the top out pin(s) 525 and/or top out key(s) 925.

In one embodiment, a portion of pin groove(s) 620 and/or key groove(s) 1020 that is closest to travel adjustment bore 615 includes a chamfer 1040 (or bevel, etc.). In one embodiment, chamfer 1040 provides a reduction of the sharpness in one or more edges of pin groove(s) 620 and/or key groove(s) 1020 about which top out pin(s) 525 and/or top out key(s) 925 are inserted. In one embodiment, chamfer 1040 will protect the top out pin(s) 525 and/or top out key(s) 925 from being damaged when they are inserted into (and moving axially about with respect to) pin groove(s) 620 and/or key groove(s) 1020.

In other words, chamfer 1040 is used to break up the top edge of pin groove(s) 620 and/or key groove(s) 1020. In so doing, when top out pin(s) 525 and/or top out key(s) 925 are riding up and down on the upper post 310 and exiting and entering pin groove(s) 620 and/or key groove(s) 1020, they would not get locked up on, gouged, or otherwise deleteriously interact with the pin groove(s) 620 and/or key groove(s) 1020. In one embodiment, the chamfer 1040 is also used to mitigate a possibility of top out pin(s) 525 and/or top out key(s) 925 jamming on the way down.

In one embodiment, the chamfer 1040 is only located about a portion of the lower post 315 to stop the surface of the top out pin(s) 525 and/or top out key(s) 925 from hitting a sharp edge and thereby preventing it from pinching. In one embodiment, the chamfer 1040 is anti-rotational such that if it is subjected to a rotational force, it does not take a bite from one side or the other, scrape something off, or otherwise damage top out pin(s) 525 and/or top out key(s) 925.

In one embodiment, more than just the top edges of the pin groove(s) 620 and/or key groove(s) 1020 have a chamfer 1040. In one embodiment, the chamfer 1040 continues along all of the pin groove(s) 620 and/or key groove(s) 1020 edges.

Referring again to FIG. 12B, in one embodiment, top out pin(s) 525 are added to the side face of the top out key(s) 925 so that different sizes of top out key(s) 925 can be chosen to remove angular play, or so that a deformable (in one embodiment, plastic) top out pin(s) 525 can be installed that will self-adjust and remove angular play. For example, in one embodiment, during operation, the lower post 315 contacts the top out pin(s) 525, which contact the top out key(s) 925, which contact the upper post 310.

In one embodiment, at least one top out pin(s) 525 is used to stop clockwise and counterclockwise rotation. In one embodiment, at least one top out pin(s) 525 is used on each side of the upper post 310 to stop both clockwise and counterclockwise rotation. In one embodiment, a plurality of top out pin(s) 525 are used about the upper post 310 to stop both clockwise and counterclockwise rotation.

As discussed herein, in general, the amount of travel adjust is dependent upon the gap between different dropper seatpost assembly 50 travel sizes. For example, different dropper seatpost assembly 50 length configurations may be based on 25 mm increments (e.g., 100, 125, 150, 175 mm, etc.), 30 mm increments (e.g., 90, 120, 150, 180, 210, etc.) or other increments. In so doing, the use of the travel adjust features, in the 30 mm increments product line for example, will provide a line of dropper seatpost assemblies with maximum extension travel from about 90 mm to about 210 mm.

Collar Interface

Figures 13, 14A, 14B, 14C:
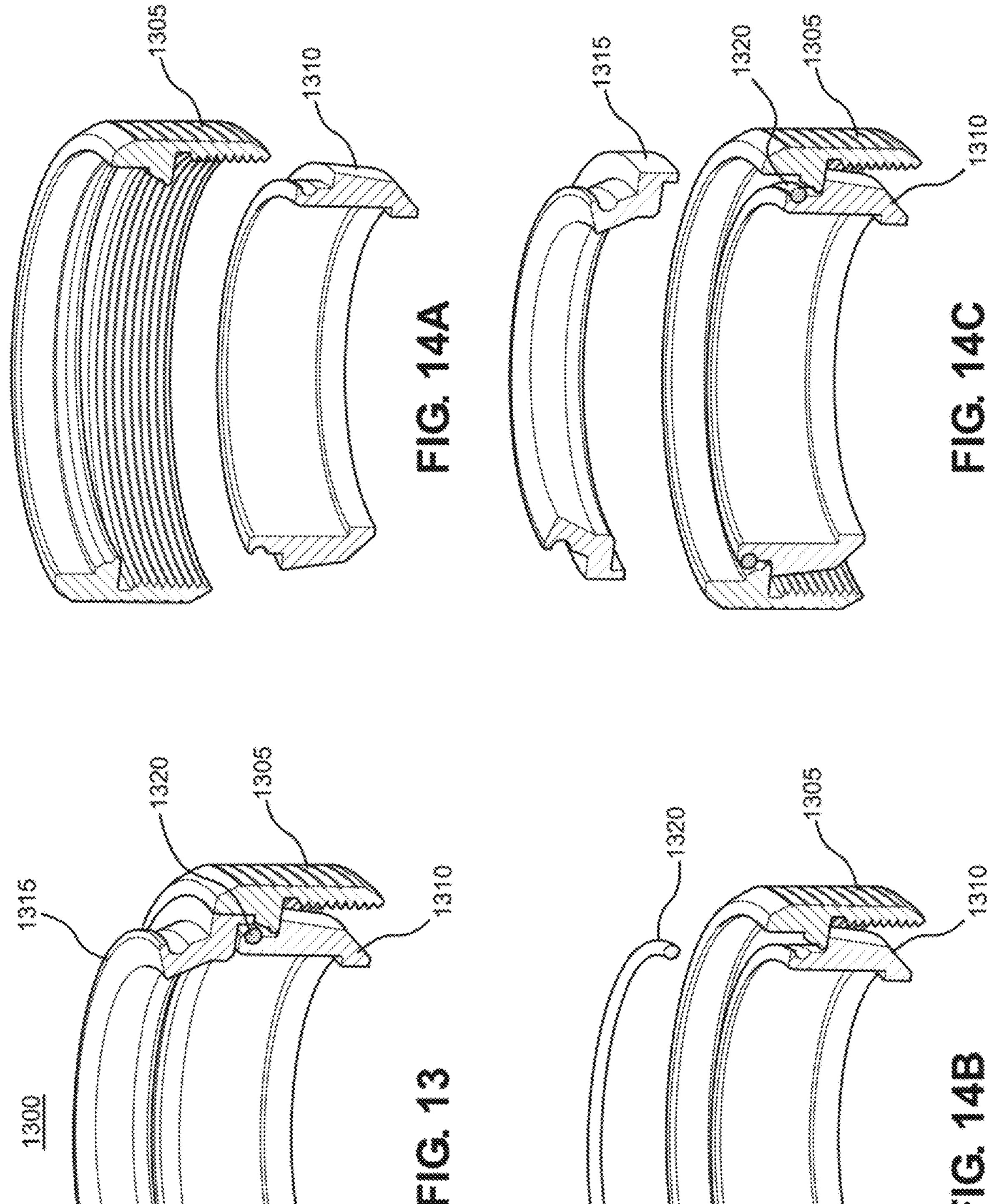
FIG. 13 is a perspective view of a collar interface, in accordance with an embodiment.
FIGS. 14A-14C are perspective cut-away views of the assembly of a collar interface, in accordance with an embodiment.
Figure 17:
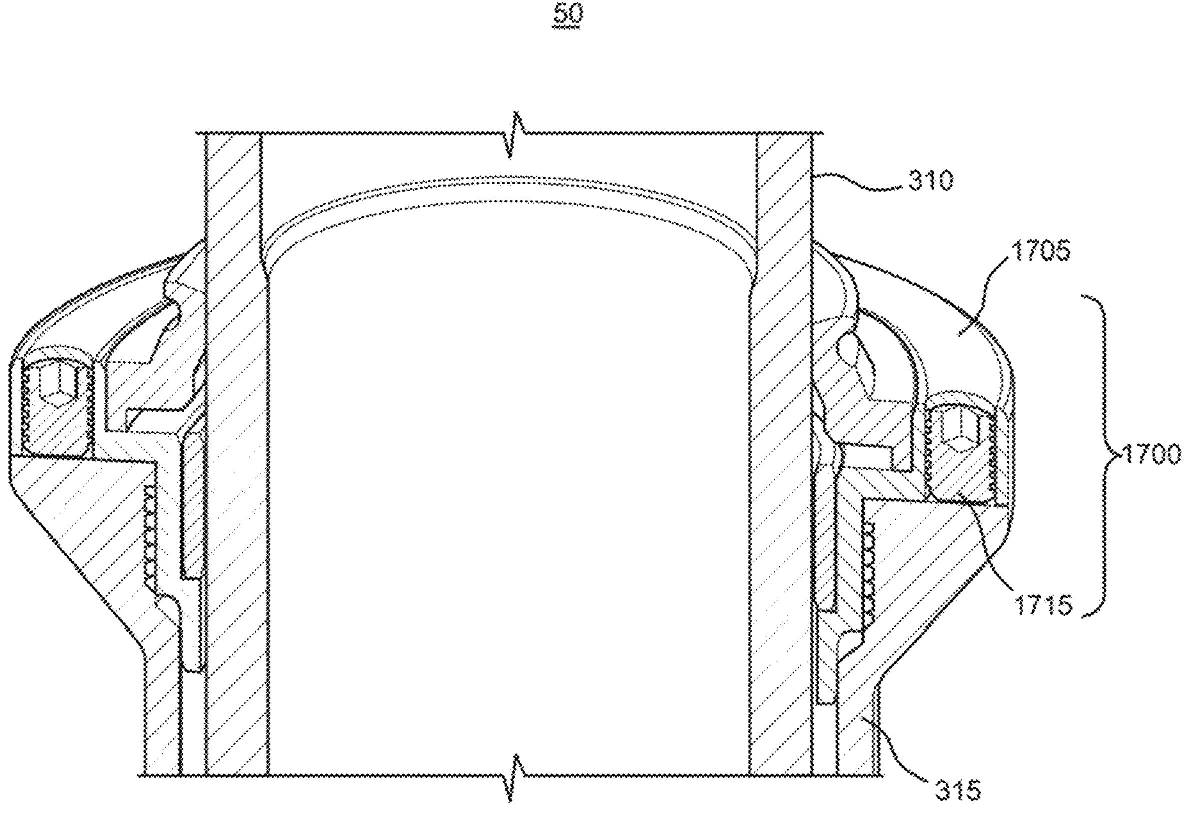
FIG. 17 is a cut-away view of a collar interface coupled with the lower post using a set screw, in accordance with an embodiment.

With reference now to FIG. 13, a collar interface 1300 is shown in accordance with an embodiment. In general, the collar interface 1300 is a readily removable interface including a collar 1305, an intermediate member (e.g., carrier 1310) and a bushing 1575 (shown in FIGS. 15A and 15B). In one embodiment, the intermediate member and the collar are one piece (as shown in FIG. 17).

In one embodiment, collar interface 1300 couples with lower post 315 to form the seatpost collar 325. In one embodiment, collar interface 1300 includes a collar 1305, a carrier 1310 (e.g., one example of an intermediate member), a wiper seal 1315, a retaining ring 1320 and is used to maintain the position of bushing 1575 (shown in FIGS. 15A and 15B). In general, the collar interface 1300 disclosed herein allows a user to adjust the travel of the dropper seatpost assembly on a trail without the use of tools. That is, to insert travel adjust spacers, the rider can easily remove the collar interface by hand, whereas previously, to adjust seatpost travel, a user would need tools to remove a collar from the seatpost.

FIGS. 14A-14C are perspective cut-away views of the assembly of a collar interface shown in accordance with an embodiment. In FIG. 14A, the collar interface includes a collar 1305 to threadedly couple with the exterior threaded collar receiver of the lower post 315, and a carrier 1310 with a tapered fit, wherein the collar 1305 presses the carrier 1310 into a press fit with respect to the lower post 315. In FIG. 14B, the collar 1305 is coupled with carrier 1310 and retaining ring 1320 is used to removably couple collar 1305 with carrier 1310. In FIG. 14C, the wiper seal 1315 is positioned above the carrier 1310 and retaining ring 1320 removably couples the carrier 1310 and the wiper seal 1315 with the collar 1305 to form the collar interface 1300 (as shown in FIG. 13). Although a tapered fit is shown, in another embodiment, the carrier 1310 could be a press fit, a slip fit, either of those with an optional sheath (or ball, ring, etc. (plastic, rubber, etc.)) between lower post 315 and carrier 1310 to reduce contact noise.

Figures 15A, 15B:
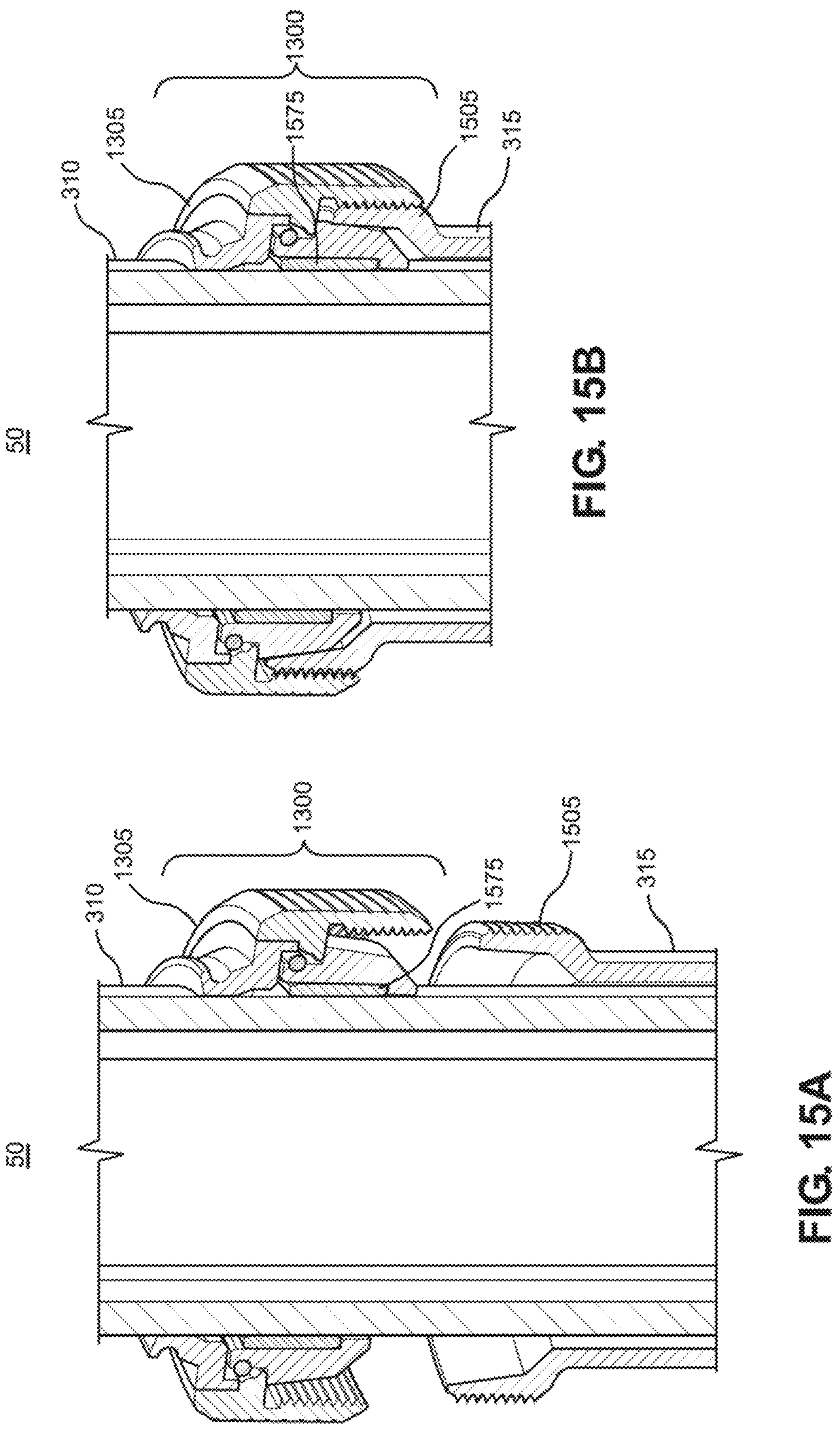
FIG. 15A is a cut-away view of the collar interface around the upper post before the collar interface is threadedly coupled with the lower post, in accordance with an embodiment.
FIG. 15B is a cut away side view of the collar interface threadedly coupled with the lower post to form the seatpost collar of the dropper seatpost assembly, in accordance with an embodiment.

Referring now to FIG. 15A, a cut-away view of the collar interface 1300 around upper post 310 is shown before the collar interface 1300 is threadedly coupled with lower post 315. FIG. 15B is a cut away side view of the collar interface 1300 threadedly coupled with lower post 315 to form the seatpost collar 325 of the dropper seatpost assembly 50.

In one embodiment, collar interface 1300 couples with the exterior threaded collar receiver 1505 of the lower post 315. In one embodiment, when assembled, the carrier 1310 of the collar interface 1300 will retain bushing 1575 and one or more travel adjustment spacer(s) 510 and/or any contact washer(s) 505 within the travel adjustment bore 615.

In one embodiment, the collar interface 1300 extracts the bushing 1575 when removed such that access to one or more travel adjustment spacer(s) 510 and/or any contact washer(s) 505 is available such as they can be installed or removed.

In one embodiment, because of the tapered design of the carrier 1310, as the collar 1305 is threaded onto the exterior threaded collar receiver 1505 of the lower post 315 the carrier 1310 will be press fit into position with respect to lower post 315. As such, in one embodiment, the collar interface 1300 is configured to be hand tightened when threadedly coupled with the exterior threaded collar receiver 1505 of lower post 315.

In one embodiment, since the carrier 1310 is press fit into position with respect to lower post 315, when the collar interface 1300 is threadedly coupled with the exterior threaded collar receiver 1505 of lower post 315, the collar interface 1300 is not subject to any forces being applied to carrier 1310 (such as from travel adjustment spacer(s) 510 and/or any contact washer(s) 505 as they interact with top out pins 525 and/or top out key(s) 925 to stop the return of the dropper seatpost assembly 50 to its longest operating length), no axial contact bushing to collar 1305 is required, the collar 1305 can be hand tight only, the creaking risk is minimized, and there is little or no collar 1305 loosening over time.

In one embodiment, a sheath material, metal mesh supported PTFE, an O-ring, or the like is used between the ID of lower post 315 and the carrier 1310 to prevent contact between the lower post 315 and the carrier 1310 and to reduce contact noise. In one embodiment, one or more of the components of collar interface 1300 are materials such as: stainless steel, aluminum, a brass alloy, another metal alloy, plastic, composite material, polymer, a combination thereof, or the like.

With reference now to FIG. 17, a cut-away view of a collar interface 1700 coupled with the lower post 315 and using a set screw 1715 to stop the collar 1705 from unwanted rotation is shown in accordance with an embodiment. In one embodiment, the carrier and collar are one piece (e.g., collar 1705) and set screw 1715 is used between the collar 1705 and the lower post 315 to stop any loosening or creaking and to reduce bushing play stackup. In one embodiment, the collar 1705 is not threaded with the exterior threaded collar receiver of the lower post 315 but is maintained by the set screw 1715. Although a set screw 1715 is disclosed in one embodiment, in another embodiment another retaining component such as a pin, ball bearing, tack, nail, bolt, or the like is utilized in place of set screw 1715.

Offset Translating Assembly Components

In one embodiment, one or more components of the translating assembly 550 (e.g., top out pins 525 in conjunction with pin groove(s) 620 and/or top out key(s) 925 in conjunction with key groove(s) 1020) are used to prevent lateral motion between the upper post 310 and the lower post 315. In one embodiment, the translating assembly 550 is also used to maintain the orientation of upper post 310 with respect to lower post 315, such that the front-to-back orientation of saddle 10 remains unchanged with respect to the plane of bike frame 119.

In one embodiment, instead of being coupled with upper post 310, top out pins 525 and/or top out key(s) 925 are coupled with lower post 315 and instead of being formed on lower post 310, pin groove(s) 620, key groove(s) 1020, and travel adjustment bore 615 are formed on upper post 310.

In one embodiment, if the seatpost retaining clamp 25 is fastened too tightly, the telescopic capability of the upper post 310 with respect to the lower post 315 can be deleteriously affected. For example, if seatpost retaining clamp 25 is fastened too tightly, it can cause a deformation in the shape of lower post 315.

For example, when the seatpost retaining clamp 25 is tightened, seatpost retaining clamp 25 will deform seat post opening 93 causing dropper seatpost assembly 50 to be frictionally coupled in a fixed position/orientation. In one embodiment, the tightening (or torquing down) of seatpost retaining clamp 25 will not only deform seat post opening 93 but will also cause a deformation in lower post 315. In one embodiment, if the deformation is large enough, it can restrict the motion of upper post 310 especially if the rotational alignment features of translating assembly 550 (e.g., one or more of top out pin(s) 525 and/or top out key(s)

925) are not being used to control the travel but are being used for rotational alignment and have to pass through the deformed section.

Often, the restriction of the motion of upper post 310 is not recognized during the change from normal saddle height to a drop saddle height, since the rider's weight is used to lower the upper post 310 with respect to the lower post 315. However, to return the saddle 10 to the normal saddle height, the dropper seatpost assembly 50 uses an air spring, air pressure, mechanical coil spring, or the like to raise upper post 310. In one embodiment, due to size and weight considerations, the force used to return the saddle 10 to the normal saddle height is much less than the pressure generated by the rider's weight applied to the saddle during the lowering or compression of the dropper seatpost assembly 50. As such, the deformation in the lower post 315 caused by seatpost retaining clamp 25 restriction is usually not large enough to stop the lowering of upper post 310, but may be large enough to restrict the corresponding return to normal saddle height of upper post 310.

In one embodiment, by offsetting one or more rotational alignment components of the translating assembly 550 of upper post 310 (e.g., one or more of top out pin(s) 525 and/or top out key(s) 925 not being used to control the travel but for rotational alignment), those rotational alignment components are not 'pinched' or otherwise impeded in their range of motion, even when a deformation is introduced into lower post 315 (such as by an overtightening of seatpost retaining clamp 25, an impact to lower post 315, or the like). In one embodiment, by offsetting, each of the different translating assembly 550 components will have "wiggle" room that will allow upper post 310 to get past a deformation during compression and return such that upper post 310 will not get "bound up" by the deformation.

Although the term "wiggle" room is used, it is not meant to suggest that the upper post 310 will wiggle with respect to lower post 315. Instead, the point of the translating assembly 550 is to ensure the two posts don't normally wiggle or have any type of lateral movement therebetween. Thus, the term "wiggle" room is used to identify a characteristic that is achieved by the offsetting of two or more components of the translating assembly 550 such that when a deformation is encountered, the translating assembly 550 does not encounter it at the same location along upper post 310 (thereby binding) but instead is able to pass a first portion of the translating assembly 550 through the deformation before at least the second portion of the translating assembly 550 encounters the deformation. As such, any actual wiggle implied by the "wiggle" room will only occur when the different portions of the offset translating assembly 550 pass through a deformation.

Plurality of Top Out Paths

In the following discussion of FIGS. 18-21 a dropper seatpost assembly 50 is shown. Except as noted herein, the dropper seatpost assembly 50 of FIGS. 18-21 is similar in form and function and utilizes components, features, and/or elements similar to (or the same as) those used in the previous dropper seatpost assembly 50 descriptions provided herein, the content of which is incorporated herein by reference.

Figure 18:
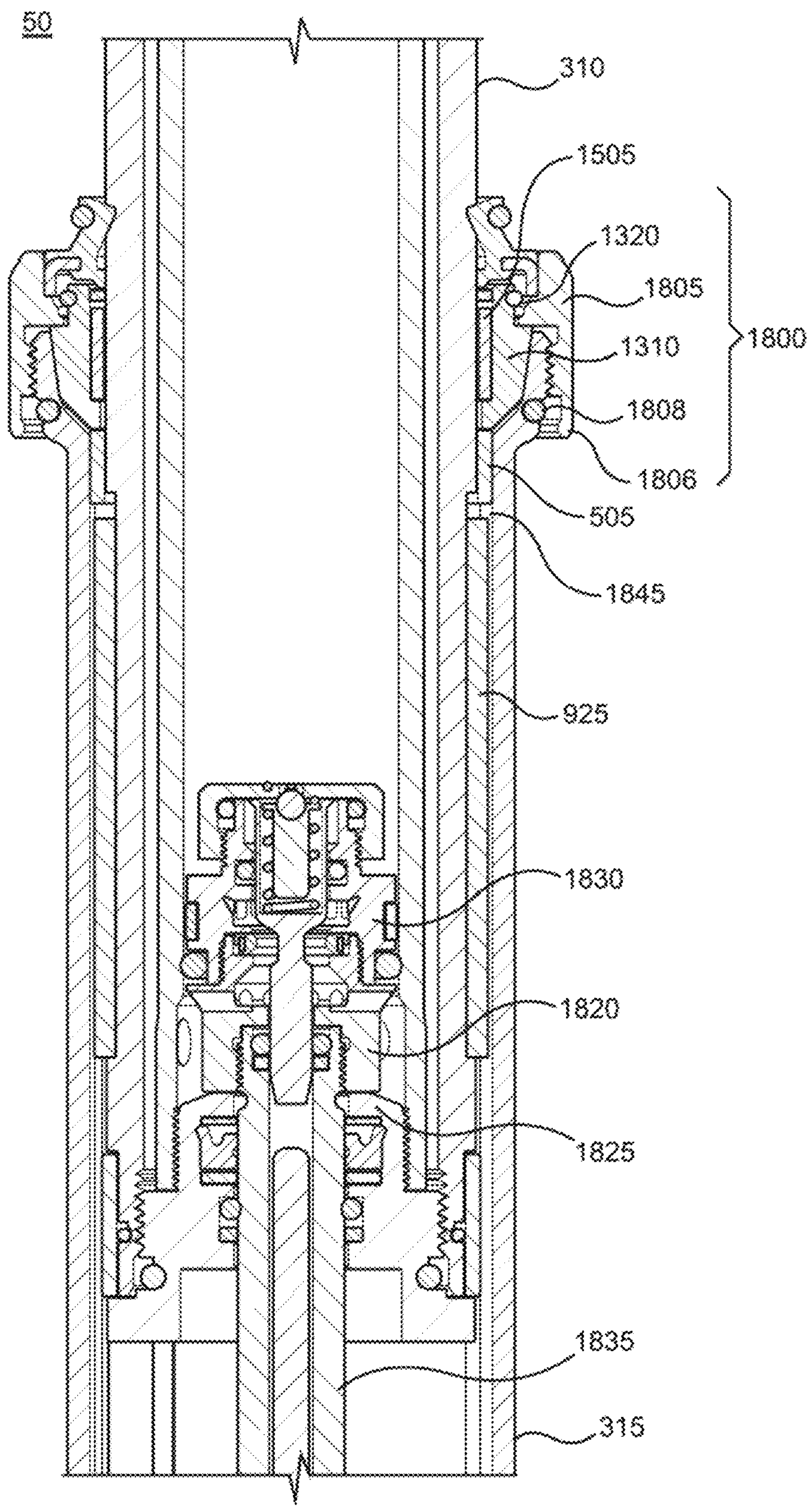
FIG. 18 is a cut-away side view of a dropper seatpost assembly with at least two distinct top out paths utilizing a first top out path, in accordance with an embodiment.

With reference now to FIG. 18, a cut-away side view of a dropper seatpost assembly 50 with at least two distinct top out paths utilizing a first top out path is shown in accordance with an embodiment. In one embodiment, dropper seatpost assembly 50 of FIG. 18 is in an extended position (similar to extended position 425 of FIG. 4D). In one embodiment, dropper seatpost assembly 50 of FIG. 18 includes upper post 310, lower post 315, collar interface 1800, and at least one translating assembly.

Collar interface 1800 is a readily removable interface such as collar interface 1300 described herein. In one embodiment, collar interface 1800 has similar components as collar interface 1300.

In one embodiment, collar 1805 of collar interface 1800 has a different profile than collar 1305. In one embodiment, collar 1805 has a lead out 1806 on the distal end thereof. In one embodiment, lead out 1806 provides less grab on collar unthreading while providing a higher torque capability to provide an additional element of robustness to the collar 1805. In one embodiment, an O-ring 1808 is used to stop collar 1805 loosening. In one embodiment, a retaining ring 1320 is used. In one embodiment, retaining ring 1320 allows the collar 1805 to pull the carrier 1310 out of the taper fit.

In one embodiment, as discussed in detail herein, the bushing 1575 need to be removable to make the travel adjust bore 615 accessible for travel adjust spacer installation and/or removal. In one embodiment, the bushing 1575 is coupled to the collar 1805 however, in this configuration concentricity between the bushing 1575 and the lower post 315 is driven by the collar threads. In another embodiment, the removable bushing 1575 is coupled to carrier 1310, which is directly constrained radially to the lower post 315 and simply axially held in place by the collar 1805. In one embodiment, pressing (or otherwise coupling) the bushing 1505 with the carrier 1310 which is then coupled with, but not concentrically constrained to, the collar 1805 the removable bushing concentricity with the lower post is achieved while still making it easily removable.

It should be noted that the above description also applies to collar 1305 of FIG. 13.

In one embodiment, dropper seatpost assembly 50 of FIG. 18 illustrates a maximum extension of dropper seatpost assembly 50 (e.g., the highest saddle height when the largest amount of upper post 310 is extended from lower post 315). In general, the maximum extension is set with a first top out path internal to dropper seatpost assembly 50.

The first top out path utilizes two components of the dropper seatpost assembly 50, a first travel length limiting component 1820 coupled with the piston shaft 1835 and a second travel length limiting component 1825 located within a bottom portion of upper post 310. In one embodiment, the second travel length limiting component 1825 is configured to move relative to the piston shaft 1835.

In one embodiment, the first travel length limiting component 1820 is the piston 1830, piston seat, another component coupled with the piston shaft 1835, piston 1830, piston seat, or the like.

In one embodiment, the second travel length limiting component 1825 is a seal head or other component that will interact with the first travel length limiting component 1820 when dropper seatpost assembly 50 is at a predefined maximum extended length.

In operation, the dropper seatpost assembly 50 will extend until a portion of the first travel length limiting component 1820 interacts with a portion of the second travel length limiting component 1825. At that point, the contact will limit any further extension of dropper seatpost assembly 50.

In one embodiment, a component such as a rubber (or plastic) washer, or the like, is located between the first travel length limiting component 1820 and the second travel length limiting component 1825 to provide non-direct contact between the first travel length limiting component 1820 and the second travel length limiting component 1825.

In one embodiment, utilizing an internal first top out path for a baseline condition (e.g., a maximum top out travel length of the dropper seatpost assembly) ensures that the axial length-limiting subassembly (upper post internals) are optimally packaged.

In one embodiment, dropper seatpost assembly 50 of FIG. 18 optionally includes at least one contact washer 505 disposed in the travel adjustment bore (e.g., travel adjustment bore 615 as shown at least in FIG. 6E). In one embodiment, contact washer 505 is removably disposed in the travel adjustment bore. In one embodiment, contact washer 505 is disposed in the travel adjustment bore and is removable when the dropper seatpost assembly 50 is at least partially disassembled. In one embodiment, contact washer 505 is disposed in the travel adjustment bore and is removable while the dropper seatpost assembly 50 is assembled in a manner such as that disclosed within the discussion of FIGS. 20 and 21.

Figure 19:
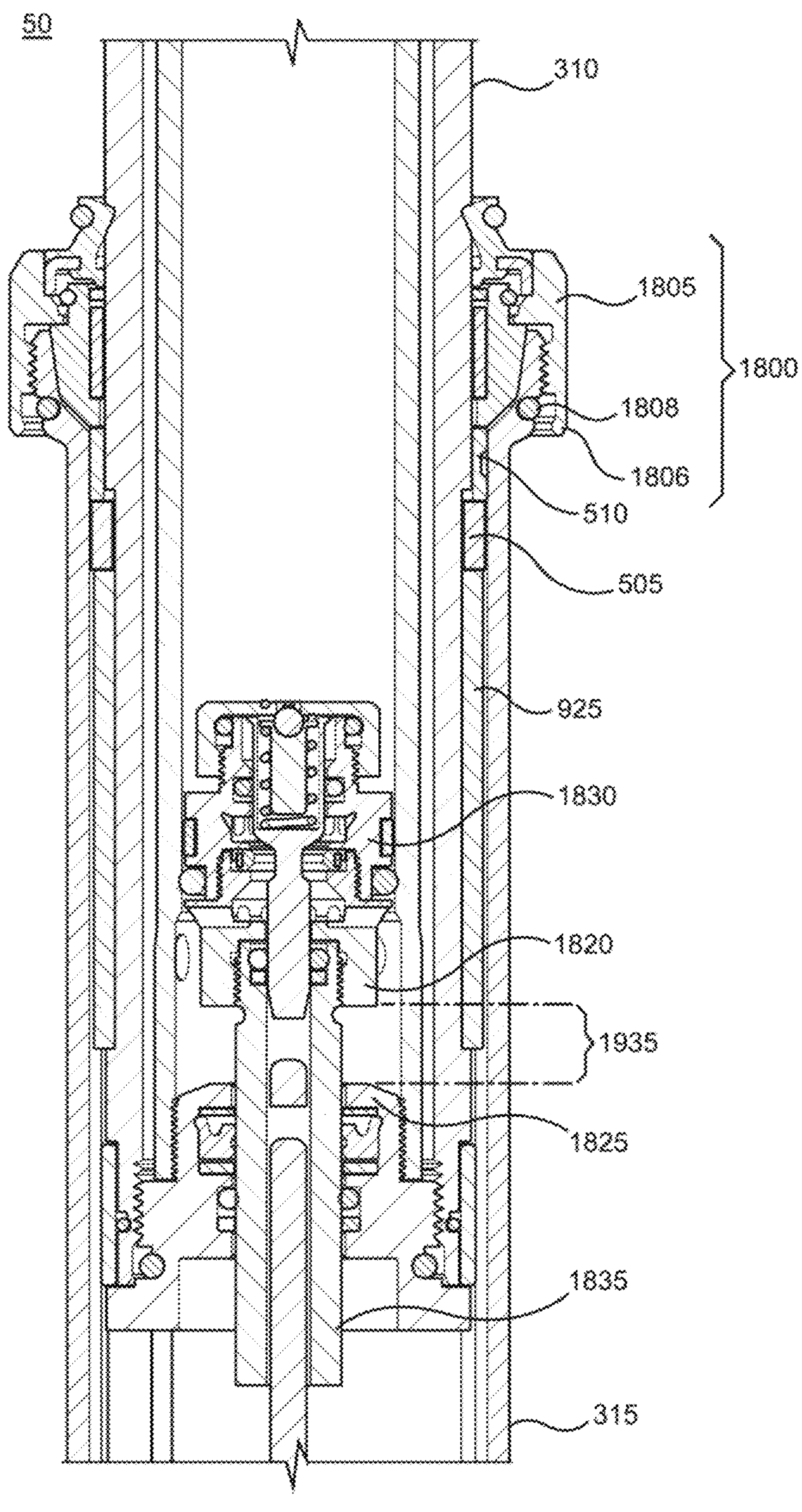
FIG. 19 is a cut-away side view of dropper seatpost assembly with at least two distinct top out paths utilizing a second top out path, in accordance with an embodiment.

With respect to the first top out path, in one embodiment, contact washer 505 is not required to interact with the translating assembly (such as one or more top out key(s) 925 thereof) when no travel adjustment spacer (such as travel adjustment spacer 510 of FIG. 6B) is disposed in the travel adjustment bore. In other words, in one embodiment, when there are no travel spacers within the travel adjustment bore, the contact between first travel length limiting component 1820 and second travel length limiting component 1825 will occur before a contact between contact washer 505 and one or more top out key(s) 925 as shown by gap 1845. Referring now to FIG. 19, a cut-away side view of dropper seatpost assembly 50 with at least two distinct top out paths utilizing a second top out path is shown in accordance with an embodiment. In one embodiment, dropper seatpost assembly 50 of FIG. 19 is in an extended position similar to that of FIG. 18. In one embodiment, dropper seatpost assembly 50 of FIG. 19 is similar to FIG. 18 except for the inclusion of a travel adjustment spacer 510 and the second top out path that utilizes the travel adjustment spacer 510.

In general, the second top out path is distinct from the first top out path and provides a modified travel length for the dropper seatpost assembly 50 that is different than the first travel length of dropper seatpost assembly 50 defined by the first top out path of FIG. 18.

The second top out path includes at least one travel adjustment spacer 510 disposed in the travel adjustment bore, where the at least one travel adjustment spacer 510 will interact with the translating assembly (such as one or more top out key(s) 925 thereof) to modify a top out travel length of the dropper seatpost assembly 50.

In one embodiment, dropper seatpost assembly 50 of FIG. 18 illustrates a reduced maximum extension of dropper seatpost assembly 50 (e.g., the reduced saddle height obtained by utilization of at least one adjustment spacer 510). Thus, the maximum extension is set with the first top out path internal to dropper seatpost assembly 50 and the modified top out travel length is less than the maximum top out travel length (e.g., less than the maximum extension) of the dropper seatpost assembly.

In operation, when at least one adjustment spacer 510 is within the travel adjustment bore the dropper seatpost assembly 50 will extend until one or more top out key(s) 925 contact the at least one travel adjustment spacer 510. In one embodiment, when at least one adjustment spacer 510 and the contact washer 505 are within the travel adjustment bore the dropper seatpost assembly 50 will extend until one or more top out key(s) 925 contact the at least one travel adjustment spacer 510 or the contact washer 505. In one embodiment, the contact washer 505 is disposed in the travel adjustment bore between the at least one travel adjustment spacer 510 and the translating assembly (e.g., one or more top out key(s) 925), such that the contact washer 505 will interact with the translating assembly (e.g., one or more top out key(s) 925) to establish the modified top out travel length of the dropper seatpost assembly.

In other words, the contact between one or more top out key(s) 925 and travel adjustment spacer 510 (or the contact washer 505) will limit any further extension of dropper seatpost assembly 50. This modified top out travel length will be the second top out path travel length of the dropper seatpost assembly. That is, the second top out path is distinct from the first top out path and provides a reduced travel length for the dropper seatpost assembly 50 (e.g., a shorter extended length than the first travel length of dropper seatpost assembly 50 defined by the first top out path of FIG. 18).

Thus, when there is a travel adjustment spacer 510 within the travel adjustment bore, the second top out path will stop the extension of the dropper seat post assembly 50 before the first top out path is engaged (e.g., before the first travel length limiting component 1820 and second travel length limiting component 1825 make contact).

In one embodiment, utilizing the external second top out path for a modified top out condition (e.g., a modified top out travel length of the dropper seatpost assembly 50) allows for the insertion (or removal) of the travel adjustment spacer 510 within the travel adjustment bore without requiring a removal of the upper post 310 (or inner tube) from the lower post 315 (or outer tube) of the dropper seatpost assembly 50. For purposes of the following discussion, disassembly of the dropper seatpost assembly 50 refers to uncoupling and/or removing the upper post 310 from the lower post 315 of the dropper seatpost assembly 50.

One embodiment further allows for the insertion (or removal) of the travel adjustment spacer 510 within the travel adjustment bore without requiring a removal of the dropper seatpost assembly 50 from a vehicle frame (such as bicycle frame 119 of FIG. 1).

In one embodiment, the insertion or removal of contact washer 505 is similarly capable of being inserted and/or removed from the travel adjustment bore without requiring the disassembly of the dropper seatpost assembly 50 and/or the removal of the dropper seatpost assembly 50 from the vehicle frame.

In one embodiment, utilizing two distinct top out paths (external and internal) provides an important safety measure. For example, if the second top out path were to fail (e.g., collar comes unthreaded, parts are damaged, or components are omitted) the first top out path will keep the dropper seatpost assembly 50 from extending past the max designed position. As such, an unexpectedly high saddle, that could otherwise cause a rider to crash, is controlled. Similarly, the first top out path will stop the dropper seatpost assembly 50 from moving to an extended position past the design point which would put deleteriously higher loads on the system, creating higher friction and higher risk of failure in a fatigue or ultimate loading scenario.

Figure 20:
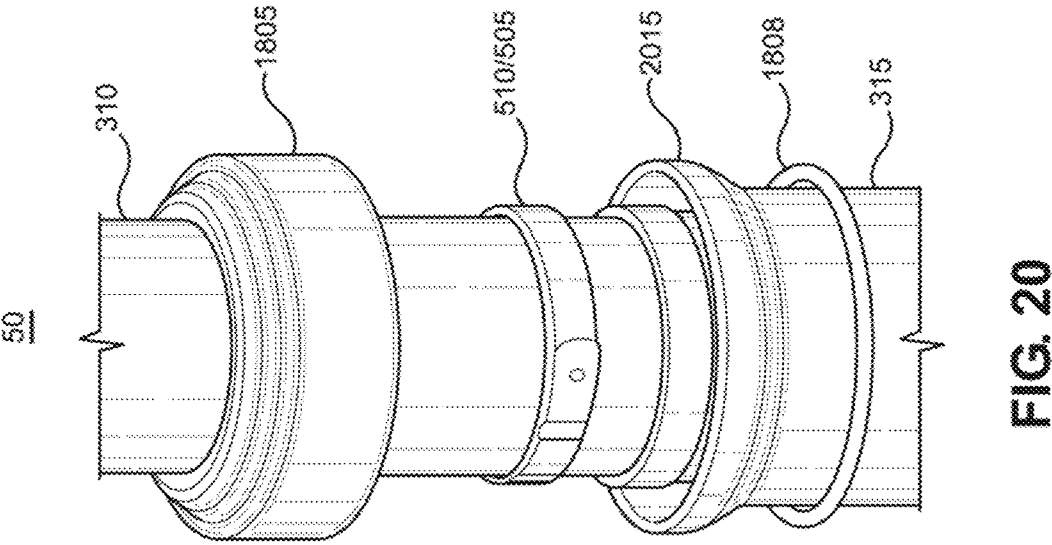
FIG. 20 is a perspective view of a dropper seatpost assembly showing at least one contact washer and/or travel adjustment spacer installation, in accordance with an embodiment.

With reference now to FIG. 20, a perspective view of a dropper seatpost assembly 50 having at least one contact washer 505 and/or travel adjustment spacer 510 installed therein is shown in accordance with an embodiment. In one embodiment, one or more travel adjustment spacer(s) 510 are installed. In one embodiment, one or more travel adjustment spacer(s) 510 and a contact washer(s) 505 is installed.

In one embodiment, the contact washer 505 is the size of a travel adjustment spacer and is used to act as the travel adjusting component.

In one embodiment, the collar 1805 is unthreaded from the threaded portion 2015 of lower post 315 and moved upward along upper post 310.

In one embodiment, the travel adjustment spacer(s) 510 and/or contact washer(s) 505 are a split ring as shown in FIGS. 6C and 6D. The split ring travel adjustment spacer(s) 510 and/or contact washer(s) 505 are then placed about the upper post 310 and then moved into the travel adjustment bore. The collar interface 1800 is then reassembled to provide a completed second top out path.

In one embodiment, because of the first top out path being separate from the second top out path, when the collar 1805 is unthreaded the dropper seat post assembly 50 will only extend to the maximum length defined by the first top out path. As such, the unscrewing of the collar 1805 and the removal and/or insertion of the travel adjustment spacer(s) 510 and/or contact washer(s) 505 can be performed without disassembling the dropper seat post assembly 50 (e.g., without uncoupling and/or removing the upper post 310 from the lower post 315 of the dropper seatpost assembly 50).

Figure 21:
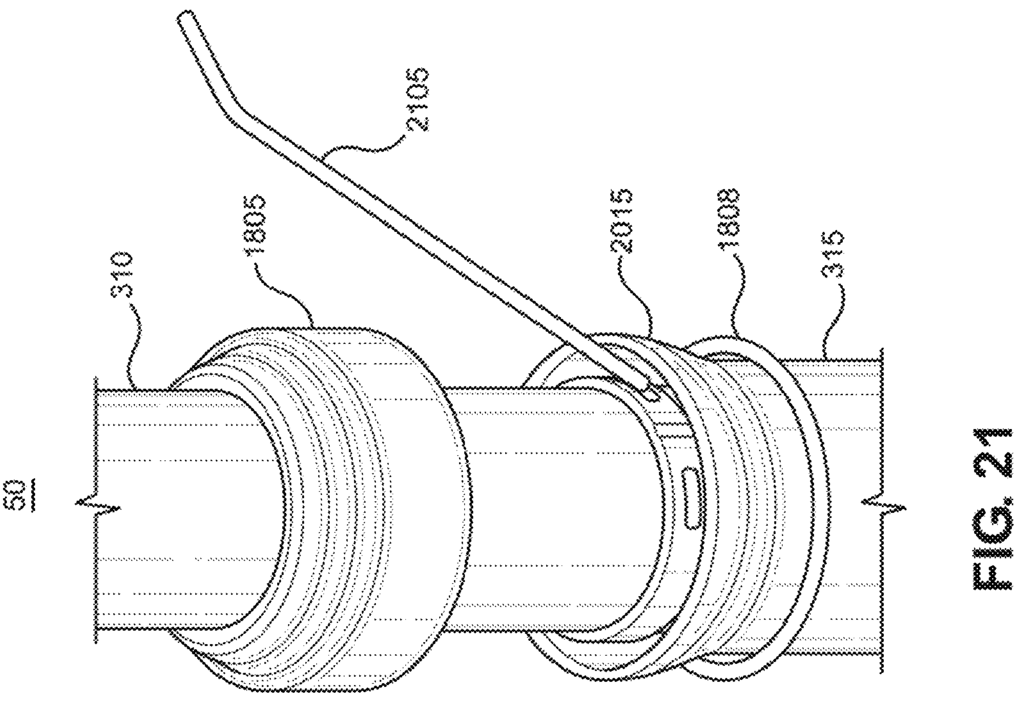
FIG. 21 is a perspective view of a dropper seatpost assembly showing at least one contact washer and/or travel adjustment spacer removal, in accordance with an embodiment.

Referring now to FIG. 21, a perspective view of a dropper seatpost assembly 50 showing a removal of at least one contact washer 505 and/or travel adjustment spacer 510 is shown in accordance with an embodiment. In one embodiment, the contact washer 505 is being removed. The components of FIG. 21 similar to those of FIG. 20 are not repeated. Instead, the discussion of FIG. 20 is incorporated by reference herein.

In general, a pick 2105 (or the like) is used to slide the travel adjustment spacer(s) 510 and/or contact washer(s) 505 out of the travel adjustment bore and axially along the upper post 310. Once the travel adjustment spacer(s) 510 and/or contact washer(s) 505 are moved out of the travel adjustment bore, it can be removed from about the upper post 310 using the split ring characteristics.

Once again, because of the first top out path being separate from the second top out path, when the collar 1805 is unthreaded the dropper seat post assembly 50 will only extend to the maximum length defined by the first top out path. As such, the unscrewing of the collar 1805 and the removal and/or insertion of the travel adjustment spacer(s) 510 and/or contact washer(s) 505 can be performed without disassembling the upper post 310 from the lower post 315 of the dropper seat post assembly 50. In one embodiment, the unscrewing of the collar 1805 and the removal and/or insertion of the travel adjustment spacer(s) 510 and/or contact washer(s) 505 can be performed without removing the dropper seatpost assembly 50 from the vehicle frame.

In general, since the first top out path will cause the dropper seatpost assembly 50 to stop at the intended max position, the travel adjust components will slide out of the travel adjustment bore with a pick 2105 (or other tool or the like). Thus, in one embodiment, due to the extension limit provided by the first top out path, the travel adjustment spacer(s) 510 and/or contact washer(s) 505 are not removed radially, but instead are slid axially up out of the travel adjust bore before pulling off radially.

In one embodiment, the travel adjustment spacer(s) 510 and/or contact washer(s) 505 do not double as a bushing. That is, they do not take any radial load but solely provide top out position modification. As such, once the collar 1805 is unscrewed and the collar interface 1800 is opened, there are no additional forces acting on the travel adjustment spacer(s) 510 and/or contact washer(s) 505 and they can be easily withdrawn from within the travel adjust bore with pick 2105 (or the like).

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A dropper seatpost assembly comprising:
- a lower post, said lower post comprising a travel adjustment bore;
- an upper post configured to interactively operate with respect to said lower post;
- a translating assembly configured to maintain at least one of an axial orientation or a rotational orientation of said upper post with respect to said lower post, or both; and
- a first top out path with a first travel length; and
- a second top out path, wherein said second top out path is distinct from said first top out path and wherein said second top out path provides a modified top out travel length different than said first travel length, wherein said modified top out travel length is less than a maximum top out travel length of said dropper seatpost assembly.

2. The dropper seatpost assembly of claim 1, wherein said first top out path comprises:
- a first travel length limiting component coupled with a piston shaft; and
- a second travel length limiting component configured to move relative to said piston shaft, wherein a portion of said first travel length limiting component will interact with a portion of said second travel length limiting component to provide said first travel length of said dropper seatpost assembly.

3. The dropper seatpost assembly of claim 1, wherein said first travel length is a maximum top out travel length of said dropper seatpost assembly.

4. The dropper seatpost assembly of claim 1, further comprising:
- at least one contact washer disposed in said travel adjustment bore.

5. The dropper seatpost assembly of claim 4, wherein said at least one contact washer is not required to interact with said translating assembly when no travel adjustment spacer is disposed in said travel adjustment bore.

6. The dropper seatpost assembly of claim 1, wherein said second top out path comprises:
- at least one travel adjustment spacer disposed in said travel adjustment bore, said at least one travel adjustment spacer configured to interact with said translating assembly to modify a top out travel length of said dropper seatpost assembly.

7. The dropper seatpost assembly of claim 6, wherein said at least one travel adjustment spacer is configured to be disposed in and withdrawn from said travel adjustment bore without requiring a removal of said upper post from said lower post of said dropper seatpost assembly.

8. The dropper seatpost assembly of claim 6, wherein said at least one travel adjustment spacer is configured to be disposed in and withdrawn from said travel adjustment bore without requiring a removal of said dropper seatpost assembly from a vehicle frame.

9. The dropper seatpost assembly of claim 6, further comprising:

at least one contact washer disposed in said travel adjustment bore between said at least one travel adjustment spacer and said translating assembly, said at least one contact washer configured to interact with said translating assembly to modify said top out travel length of said dropper seatpost assembly.

10. The dropper seatpost assembly of claim 9, wherein said at least one contact washer is configured to be disposed in and withdrawn from said travel adjustment bore without requiring a removal of said upper post from said lower post of said dropper seatpost assembly.

11. The dropper seatpost assembly of claim 9, wherein said at least one contact washer is configured to be disposed in and withdrawn from said travel adjustment bore without requiring a removal of said dropper seatpost assembly from a vehicle frame.

12. A dropper seatpost assembly comprising:

a lower post, said lower post comprising a travel adjustment bore;

an upper post configured to interactively operate with respect to said lower post;

a translating assembly configured to maintain at least one of an axial orientation or a rotational orientation of said upper post with respect to said lower post, or both;

at least one contact washer removably disposed in said travel adjustment bore, wherein said at least one contact washer is not required to interact with said translating assembly when no travel adjustment spacer is disposed in said travel adjustment bore;

a first top out path with a first travel length; and a second top out path, wherein said second top out path is distinct from said first top out path and wherein said second top out path provides a modified travel length different than said first travel length.

13. The dropper seatpost assembly of claim 12, wherein said first top out path comprises:

a first travel length limiting component coupled with a piston shaft; and a second travel length limiting component configured to move relative to said piston shaft, wherein a portion of said first travel length limiting component will interact with a portion of said second travel length limiting component to provide said first travel length of said dropper seatpost assembly.

14. The dropper seatpost assembly of claim 12, wherein said first travel length is a maximum top out travel length of said dropper seatpost assembly.

15. The dropper seatpost assembly of claim 12, wherein said second top out path comprises:

at least one travel adjustment spacer disposed in said travel adjustment bore; and said at least one contact washer disposed in said travel adjustment bore, said at least one contact washer disposed in said travel adjustment bore between said at least one travel adjustment spacer and said translating assembly, said at least one travel adjustment spacer and said at least one contact washer configured to interact with said translating assembly to modify a top out travel length of said dropper seatpost assembly to less than a maximum top out travel length of said dropper seatpost assembly.

16. The dropper seatpost assembly of claim 15, wherein said at least one travel adjustment spacer is configured to be disposed in and withdrawn from said travel adjustment bore without requiring a removal of said upper post from said lower post of said dropper seatpost assembly.

17. The dropper seatpost assembly of claim 15, wherein said at least one travel adjustment spacer is configured to be disposed in and withdrawn from said travel adjustment bore without requiring a removal of said dropper seatpost assembly from a vehicle frame.

18. A dropper seatpost assembly comprising:

a lower post, said lower post comprising:

a travel adjustment bore;

an upper post configured to interactively operate with respect to said lower post;

a translating assembly configured to maintain at least one of an axial orientation or a rotational orientation of said upper post with respect to said lower post, or both;

at least one contact washer removably disposed in said travel adjustment bore, wherein said at least one contact washer is not required to interact with said translating assembly when no travel adjustment spacer is disposed in said travel adjustment bore;

a first top out path with a first travel length, said first top out path comprising:

a first travel length limiting component coupled with a piston shaft; and a second travel length limiting component configured to move relative to said piston shaft, wherein a portion of said first travel length limiting component will interact with a portion of said second travel length limiting component to provide said first travel length of said dropper seatpost assembly; and a second top out path, wherein said second top out path is distinct from said first top out path and wherein said second top out path provides a modified travel length less than said first travel length.

19. The dropper seatpost assembly of claim 18, wherein said second top out path comprises:

at least one travel adjustment spacer removably disposed in said travel adjustment bore; and said at least one contact washer disposed in said travel adjustment bore between said at least one travel adjustment spacer and said translating assembly, said at least one travel adjustment spacer and said at least one contact washer configured to:

interact with said translating assembly to modify said first travel length of said dropper seatpost assembly.

* * * * *